United States Patent
Dai et al.

(10) Patent No.: US 10,061,101 B2
(45) Date of Patent: Aug. 28, 2018

(54) ULTRA-WIDE-ANGLE LENS ASSEMBLY

(71) Applicant: ZHEJIANG SUNNY OPTICS CO., LTD., Ningbo (CN)

(72) Inventors: Fujian Dai, Ningbo (CN); Jianke Wenren, Ningbo (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 2 days.

(21) Appl. No.: 15/305,281

(22) PCT Filed: Mar. 8, 2016

(86) PCT No.: PCT/CN2016/075855
§ 371 (c)(1),
(2) Date: Oct. 19, 2016

(87) PCT Pub. No.: WO2017/020587
PCT Pub. Date: Feb. 9, 2017

(65) Prior Publication Data
US 2017/0184818 A1 Jun. 29, 2017

(30) Foreign Application Priority Data
Aug. 6, 2015 (CN) .......................... 2015 1 0479118

(51) Int. Cl.
*G02B 9/62* (2006.01)
*G02B 13/00* (2006.01)

(52) U.S. Cl.
CPC ........... *G02B 9/62* (2013.01); *G02B 13/0045* (2013.01)

(58) Field of Classification Search
CPC ... G02B 9/00; G02B 9/62; G02B 9/64; G02B 13/0045; G02B 13/005; G02B 13/02; G02B 13/04
USPC ........ 359/708, 713, 745, 749–752, 754–756, 359/761, 762
See application file for complete search history.

(56) References Cited

U.S. PATENT DOCUMENTS 9,158,094 B1 * 10/2015 Chen .......................... G02B 9/62
2003/0174410 A1 9/2003 Noda

FOREIGN PATENT DOCUMENTS

CN 101846792 A 9/2010
CN 102213821 A 10/2011
(Continued)

OTHER PUBLICATIONS

International Search Report issued in PCT/CN2016/075855 dated May 27, 2016 (5 pages).
(Continued)

*Primary Examiner* — Darryl J Collins
(74) *Attorney, Agent, or Firm* — Osha Liang LLP

(57) ABSTRACT

An ultra-wide-angle lens assembly that includes a first lens, a second lens, a third lens, a fourth lens, a fifth lens and a sixth lens from an object side to an image side of the ultra-wide-angle lens assembly in turn. The first lens has a negative refractive power; the second lens has a refractive power, an object side surface of the second lens is convex, and an image side surface of the second lens is concave; the third lens has a positive refractive power, and an object side surface of the third lens is convex; the fourth lens has a positive refractive power; the fifth lens has a negative refractive power; and the sixth lens has a positive refractive power, and an image side surface of the sixth lens has a proximal portion relative to an optical axis in a concave shape.

20 Claims, 20 Drawing Sheets

(56) References Cited

FOREIGN PATENT DOCUMENTS

| CN | 104007535 A | 8/2014 |
| CN | 104330868 A | 2/2015 |
| CN | 104991331 A | 10/2015 |
| JP | 2002341245 A | 11/2002 |

OTHER PUBLICATIONS

Written Opinion of the International Searching Authority issued in PCT/CN2016/075855 dated May 27, 2016 (5 pages).
Office Action issued in corresponding Chinese Application No. 201510479118.1 dated Dec. 16, 2016, and English translation thereof (16 pages).
Office Action issued in corresponding Japanese Application No. 2016565662 dated Sep. 1, 2017, and English translation thereof (9 pages).

\* cited by examiner

ULTRA-WIDE-ANGLE LENS ASSEMBLY

CROSS-REFERENCE TO RELATED APPLICATION

This application is the U.S. national phase of PCT Application No. PCT/CN2016/075855 filed on Mar. 8, 2016, which claims a priority to and benefits of Chinese Patent Application Serial No. 201510479118.1, filed with the State Intellectual Property Office of P. R. China on Aug. 6, 2015, the entire content of which are incorporated herein by reference.

FIELD

The present disclosure relates to an imaging technology, and more particularly to an ultra-wide-angle lens assembly.

BACKGROUND

With the development of semiconductor technology, a Charge Coupled Device (CCD) or Complementary Metal-Oxide-Semiconductor Transistor (CMOS) image sensor is developed to be of a decreasing size and an increasing pixel value, which correspondingly requires an imaging lens assembly to be developed towards miniaturization with high resolution. However, in some cases, the imaging lens is also required to be of a wide-angle characteristic which is realized currently by increasing the number of lenses, which is not conducive to the miniaturization, and deteriorates an aberration control effect, and thus resulting in a deteriorative imaging quality.

SUMMARY

Embodiments of the present disclosure seek to solve at least one of the problems existing in the related art to at least some extent. For this, the present disclosure provides in embodiments an ultra-wide-angle lens assembly.

The ultra-wide-angle lens assembly according to embodiments of the present disclosure includes: a first lens, a second lens, a third lens, a fourth lens, a fifth lens and a sixth lens from an object side of the ultra-wide-angle lens assembly to an image side of the ultra-wide-angle lens assembly in turn, wherein the first lens is of a negative refractive power;

the second lens is of a refractive power, an object side surface of the second lens is convex, and an image side surface of the second lens is concave;

the third lens is of a positive refractive power, and an object side surface of the third lens is convex;

the fourth lens is of a positive refractive power;

the fifth lens is of a negative refractive power; and the sixth lens is of a positive refractive power, and an image side surface of the sixth lens has a proximal portion in relative to an optical axis in a concave shape, and the ultra-wide-angle lens assembly meets the following formulas:

$|\tan(HFOV)|/TTL > 0.9 \text{ mm}^{-1}$; and $-2.0 < f1/f < 0$, wherein

HFOV equals to half of a maximum field angle of the ultra-wide-angle lens assembly, TTL represents a total length of the ultra-wide-angle lens assembly, f1 represents an effective focal length of the first lens, and f represents an effective focal length of the ultra-wide-angle lens assembly.

In some embodiments, the first lens is made of a glass or plastic material.

In some embodiments, an image side surface of the first lens is concave, and the ultra-wide-angle lens assembly meets the following formula:

$1 < SAG12/CT1 < 2.5$, wherein

SAG12 represents a horizontal displacement from an intersection of the image side surface of the first lens and the optic axis to a maximum effective radius of the image side surface of the first lens; and CT1 represents a thickness of the first lens in a direction along the optic axial.

In some embodiments, the ultra-wide-angle lens assembly meets the following formula:

$-0.2 < f/f2 < 0$, wherein f2 represents an effective focal length of the second lens, and f represents the effective focal length of the ultra-wide-angle lens assembly.

In some embodiments, an image side surface of the fourth lens is convex, an object side surface of the fifth lens is concave, and the ultra-wide-angle lens assembly meets the following formula:

$|(R8-R9)/(R8+R9)| < 0.1$, wherein

R8 represents a curvature radius of the image side surface of the fourth lens, and R9 represents a curvature radius of the object side surface of the fifth lens.

In some embodiments, the ultra-wide-angle lens assembly meets the following formula:

$0.5 < R4/R5 < 1.5$, wherein

R4 represents a curvature radius of the image side surface of the second lens, and R5 represents a curvature radius of the object side surface of the third lens.

In some embodiments, the image side surface of the sixth lens includes at least one point of inflection, and the ultra-wide-angle lens assembly meets the following formula:

$0.5 < Yc62/ImgH < 1$, wherein

Yc62 represents a vertical distance from the point of inflection on the image side surface of the sixth lens to the optic axis, and ImgH represents a half-length of a diagonal of an effective pixel region at an imaging side surface of the ultra-wide-angle lens assembly.

In some embodiments, the ultra-wide-angle lens assembly meets the following formula:

$1.5 < f45/f < 6.0$, wherein f45 represents a combined focal length of the fourth lens and the fifth lens, and f represents the effective focal length of the ultra-wide-angle lens assembly.

In some embodiments, the ultra-wide-angle lens assembly includes an aperture stop arranged between the third lens and the fourth lens.

In some embodiments, an image side surface of the third lens is concave, and an object side surface of the sixth lens has a proximal portion in relative to the optical axis in a convex shape.

In some embodiments, an object side surface of the fourth lens is convex, and an image side surface of the fifth lens is convex.

Meeting the above configurations is conducive to miniaturizing the ultra-wide-angle lens assembly and expanding the field angle at the same time, realizing the ultra-wide-angle characteristic, modifying various kinds of aberrations, and improving the imaging quality.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
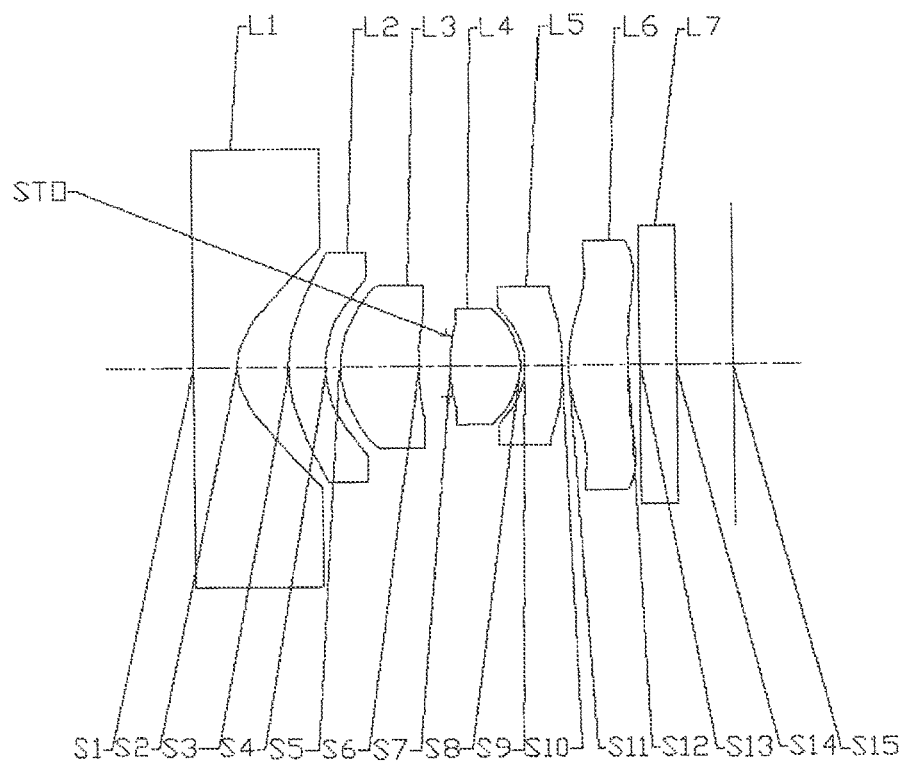
FIG. 1 is a schematic view showing an ultra-wide-angle lens assembly according to Embodiment 1 of the present disclosure.
Figure 2:
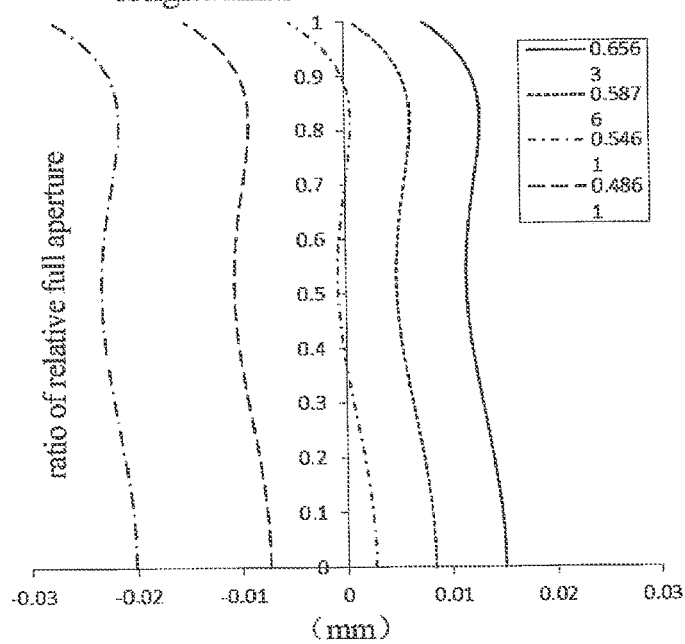
FIG. 2 is a diagram showing a longitudinal aberration curve (mm) of the ultra-wide-angle lens assembly in Embodiment 1.
Figure 3:
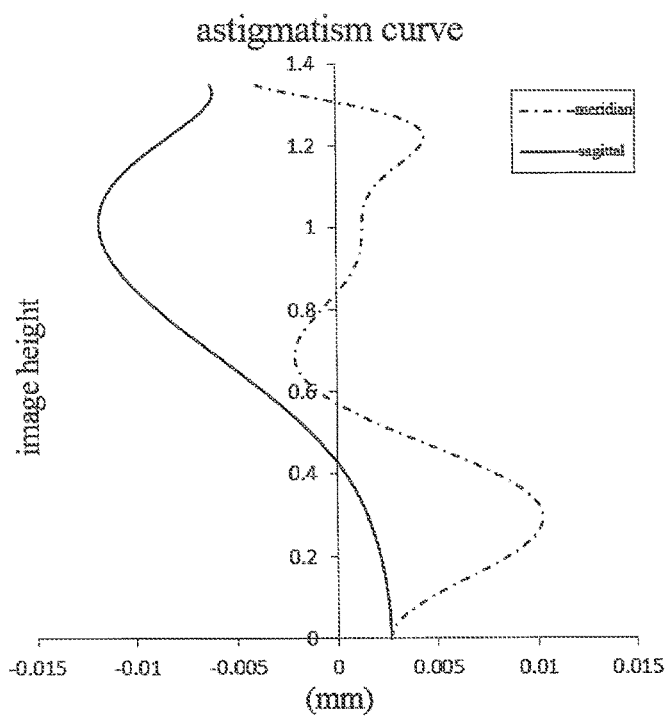
FIG. 3 is a diagram showing an astigmatism curve (mm) of the ultra-wide-angle lens assembly in Embodiment 1.
Figure 4:
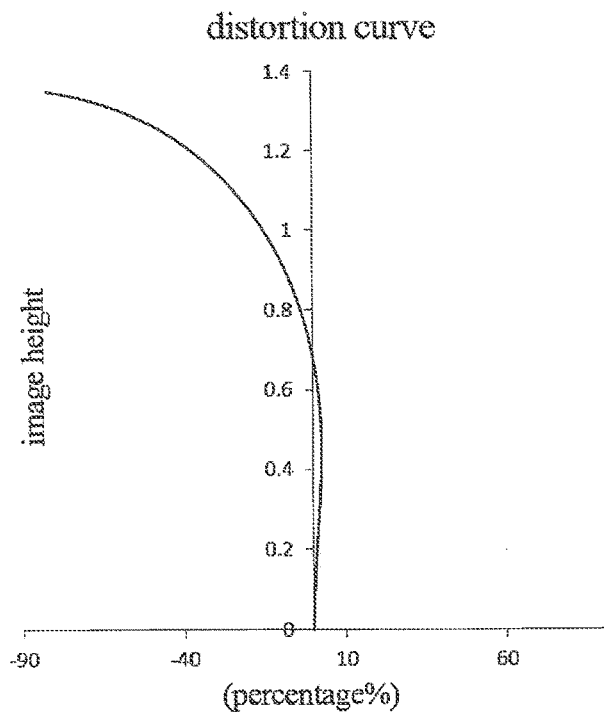
FIG. 4 is a diagram showing a distortion curve (%) of the ultra-wide-angle lens assembly in Embodiment 1.
Figure 5:
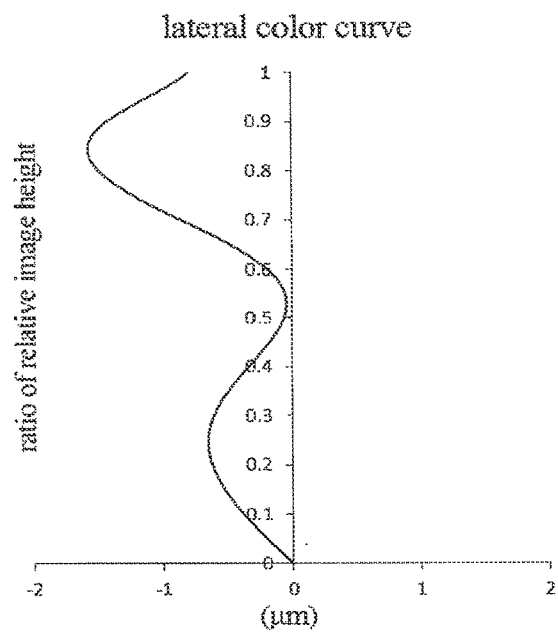
FIG. 5 is a diagram showing a lateral color curve (μm) of the ultra-wide-angle lens assembly in Embodiment 1.
Figure 6:
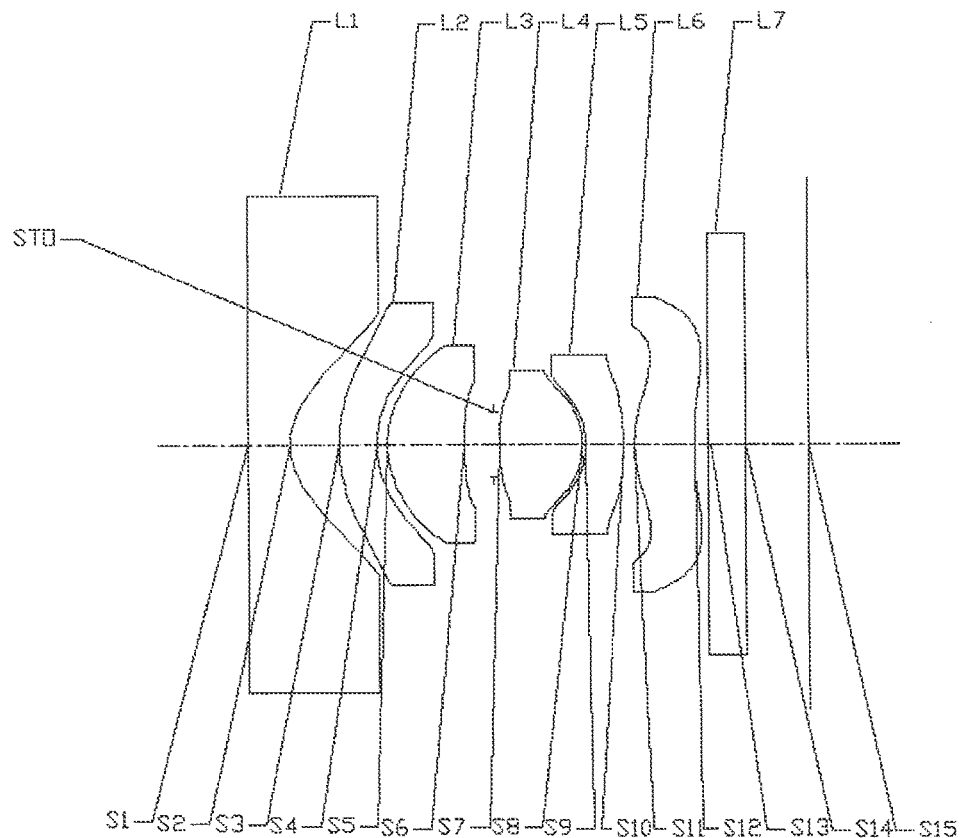
FIG. 6 is a schematic view showing an ultra-wide-angle lens assembly according to Embodiment 2 of the present disclosure.
Figure 7:
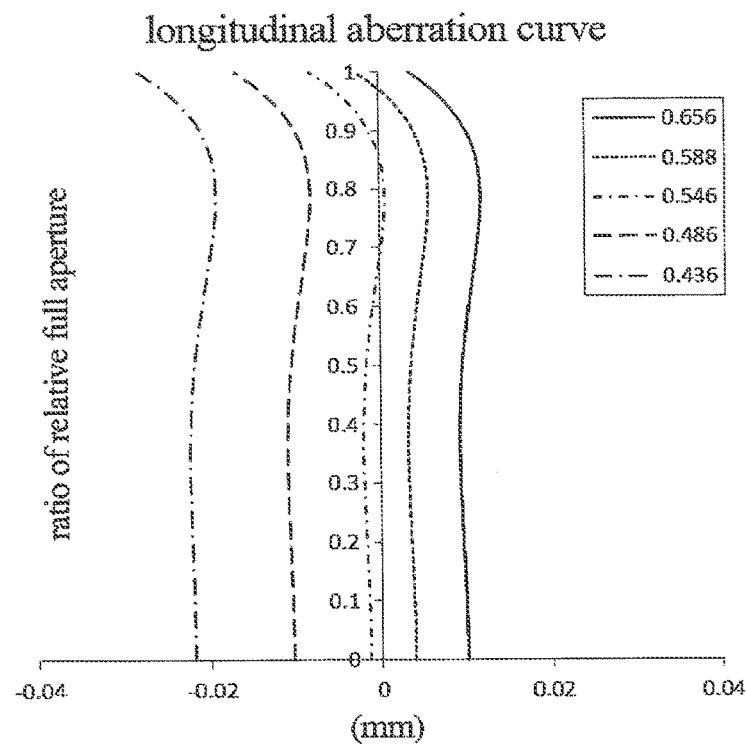
FIG. 7 is a diagram showing a longitudinal aberration curve (mm) of the ultra-wide-angle lens assembly in Embodiment 2.
Figure 8:
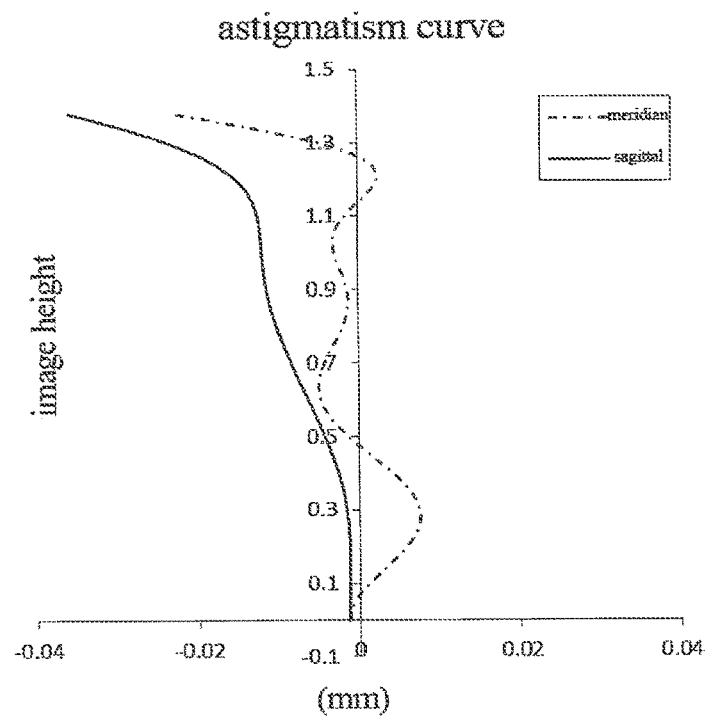
FIG. 8 is a diagram showing an astigmatism curve (mm) of the ultra-wide-angle lens assembly in Embodiment 2.
Figure 9:
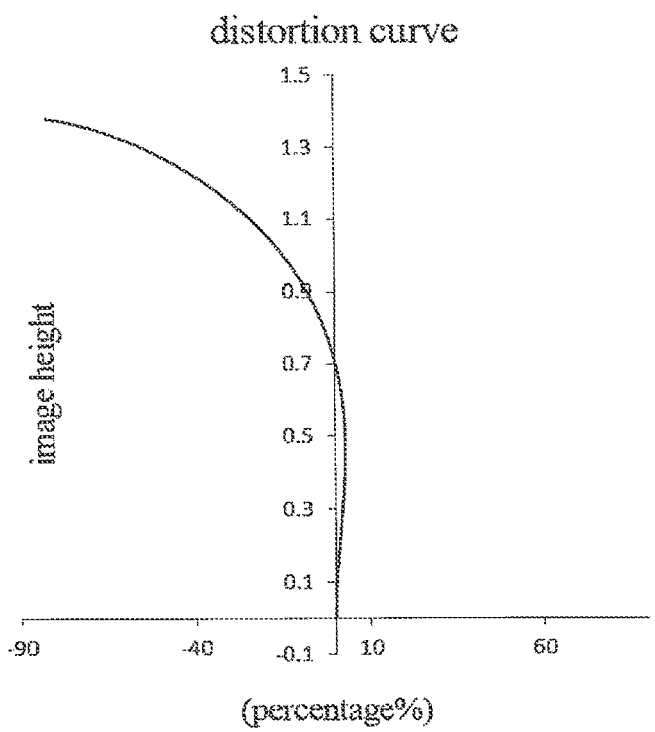
FIG. 9 is a diagram showing a distortion curve (%) of the ultra-wide-angle lens assembly in Embodiment 2.
Figure 10:
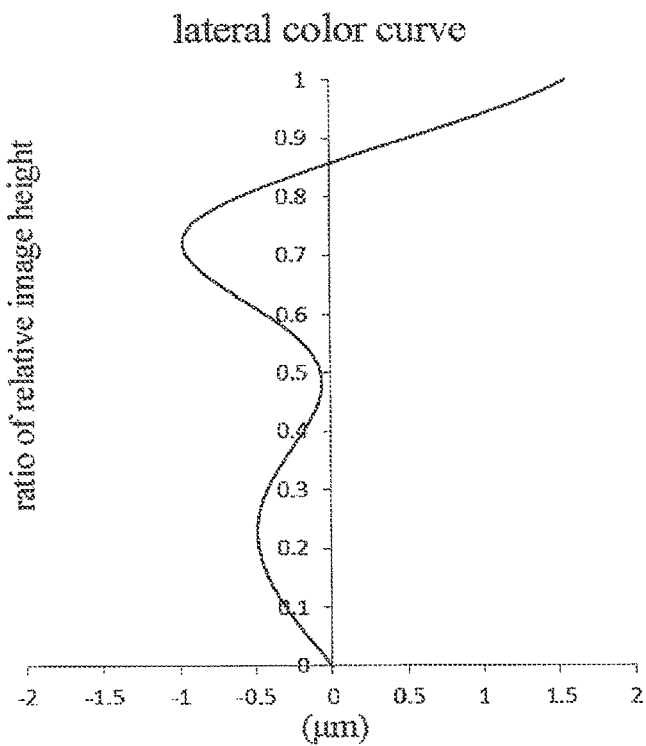
FIG. 10 is a diagram showing a lateral color curve (μm) of the ultra-wide-angle lens assembly in Embodiment 2.
Figure 11:
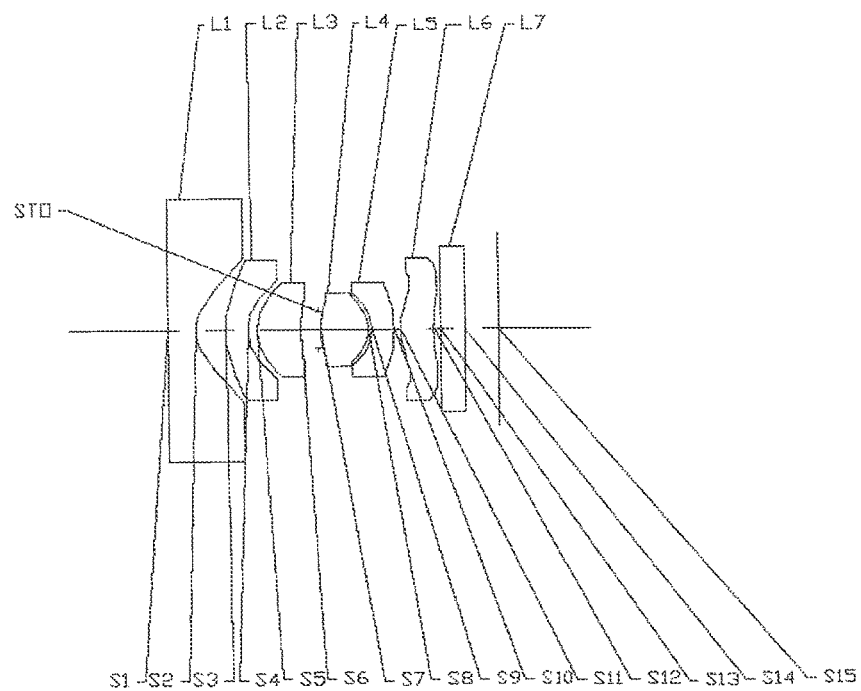
FIG. 11 is a schematic view showing an ultra-wide-angle lens assembly according to Embodiment 3 of the present disclosure.
Figure 12:
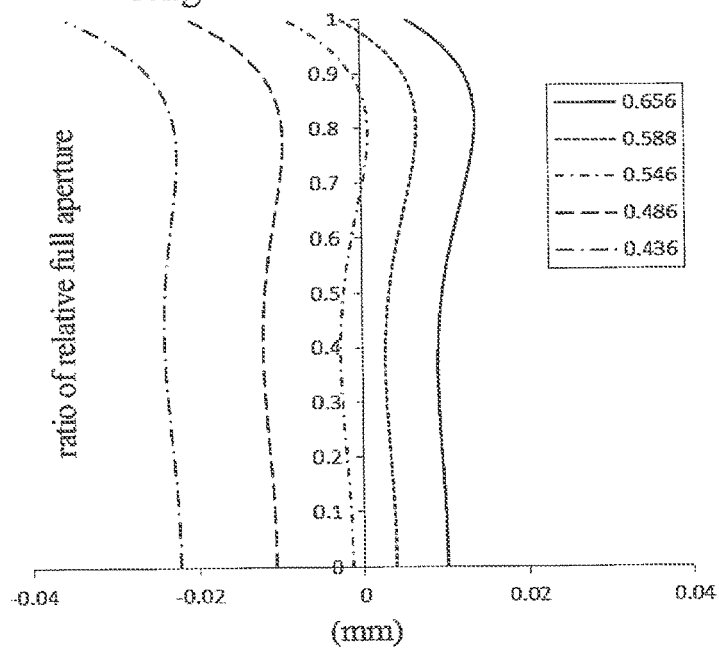
FIG. 12 is a diagram showing a longitudinal aberration curve (mm) of the ultra-wide-angle lens assembly in Embodiment 3.
Figure 13:
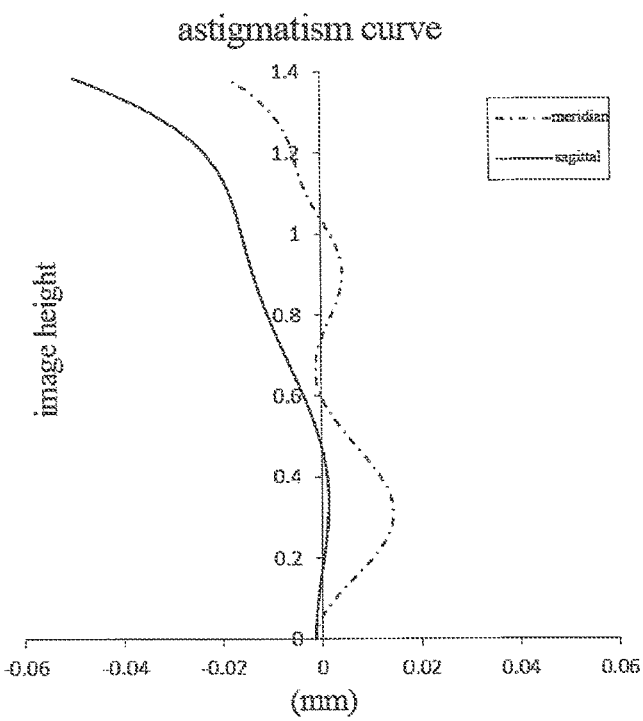
FIG. 13 is a diagram showing an astigmatism curve (mm) of the ultra-wide-angle lens assembly in Embodiment 3.
Figure 14:
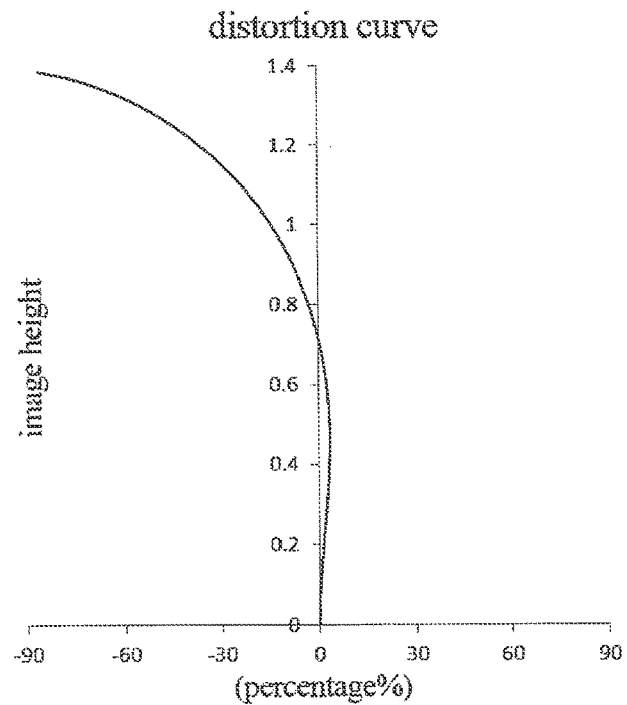
FIG. 14 is a diagram showing a distortion curve (%) of the ultra-wide-angle lens assembly in Embodiment 3.
Figure 15:
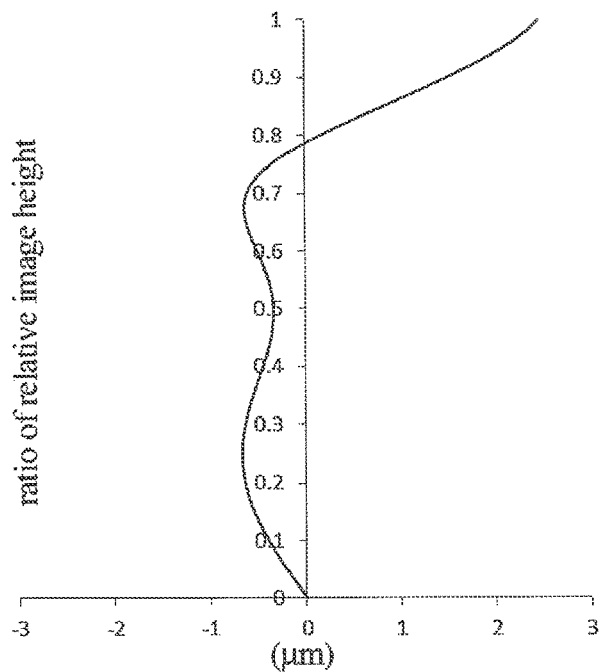
FIG. 15 is a diagram showing a lateral color curve (μm) of the ultra-wide-angle lens assembly in Embodiment 3.
Figure 16:
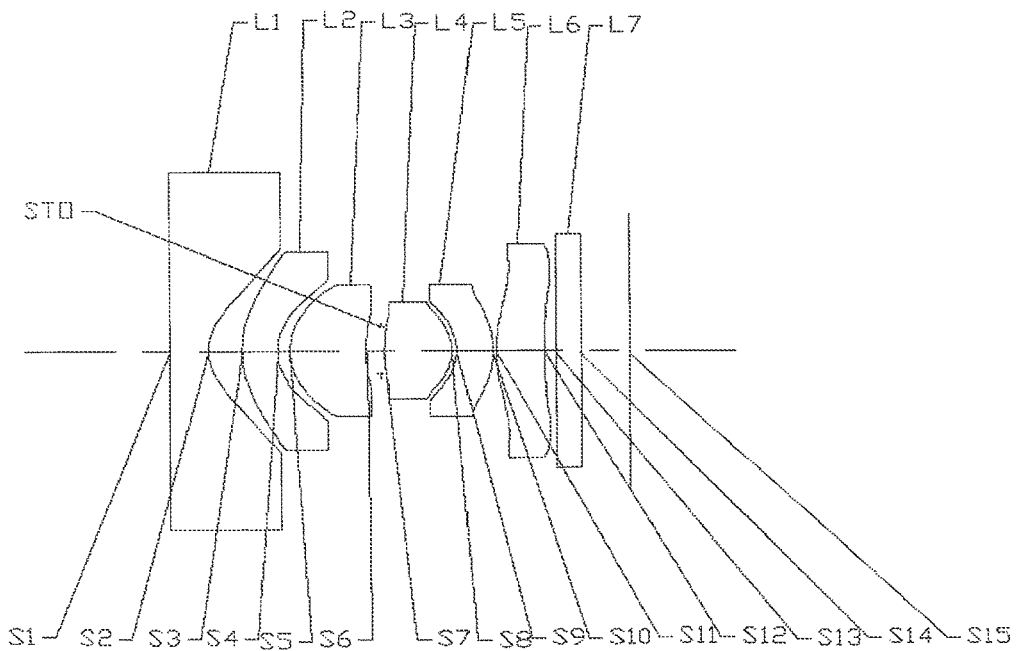
FIG. 16 is a schematic view showing an ultra-wide-angle lens assembly according to Embodiment 4 of the present disclosure.
Figure 17:
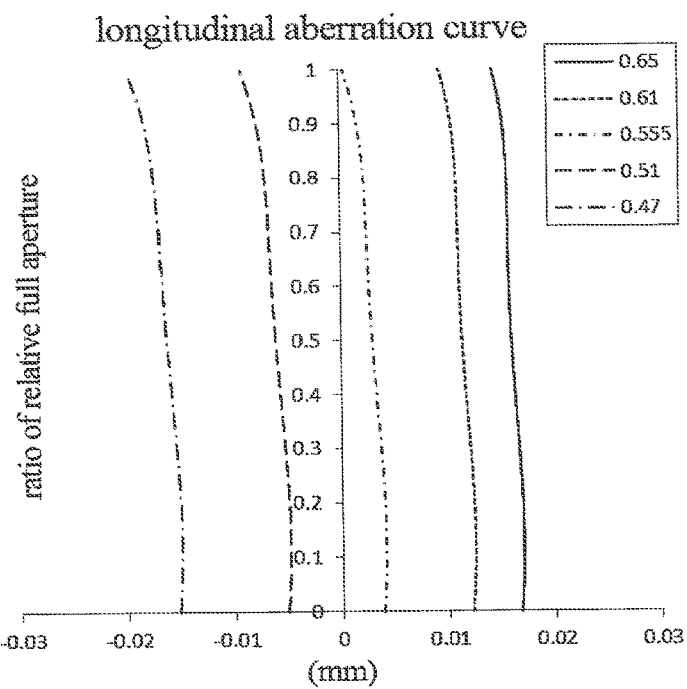
FIG. 17 is a diagram showing a longitudinal aberration curve (mm) of the ultra-wide-angle lens assembly in Embodiment 4.
Figure 18:
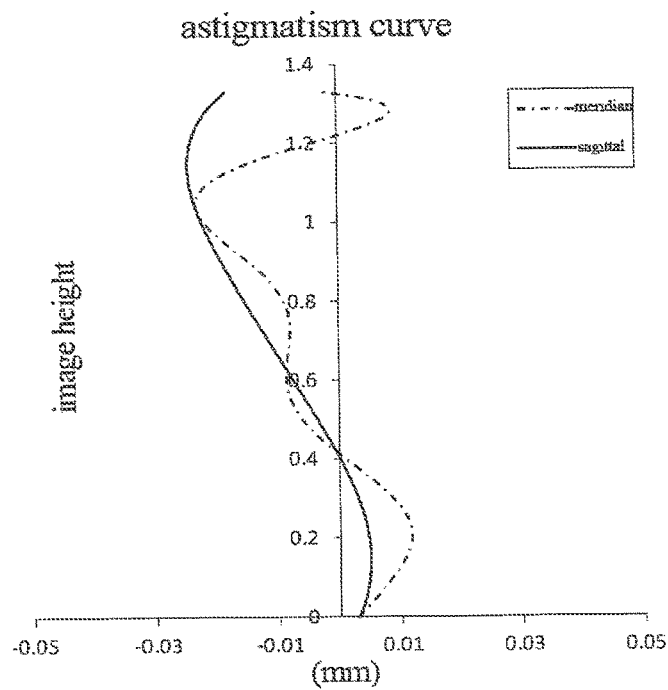
FIG. 18 is a diagram showing an astigmatism curve (mm) of the ultra-wide-angle lens assembly in Embodiment 4.
Figure 19:
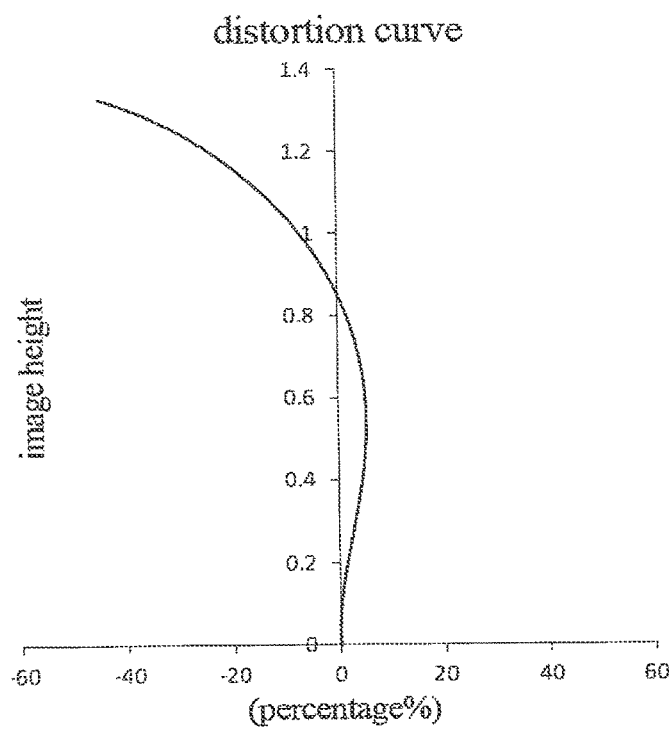
FIG. 19 is a diagram showing a distortion curve (%) of the ultra-wide-angle lens assembly in Embodiment 4.
Figure 20:
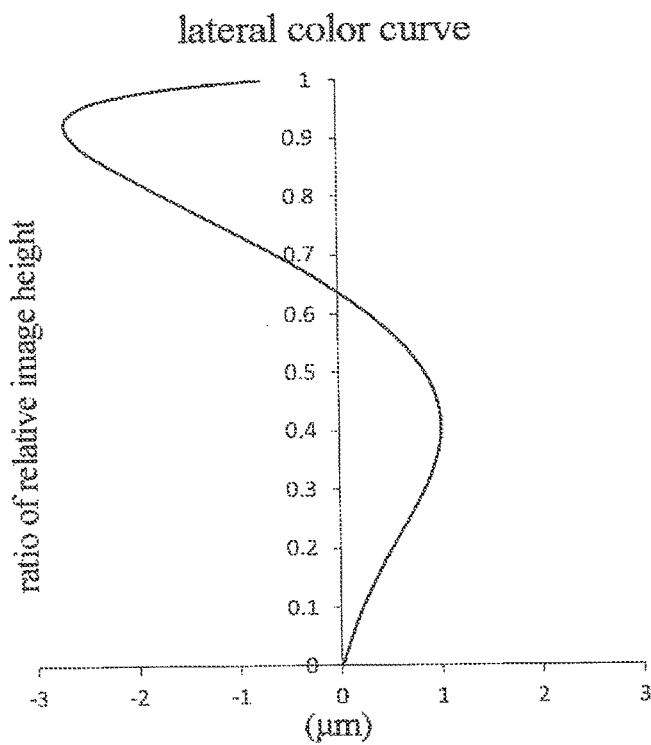
FIG. 20 is a diagram showing a lateral color curve (μm) of the ultra-wide-angle lens assembly in Embodiment 4.
Figure 21:
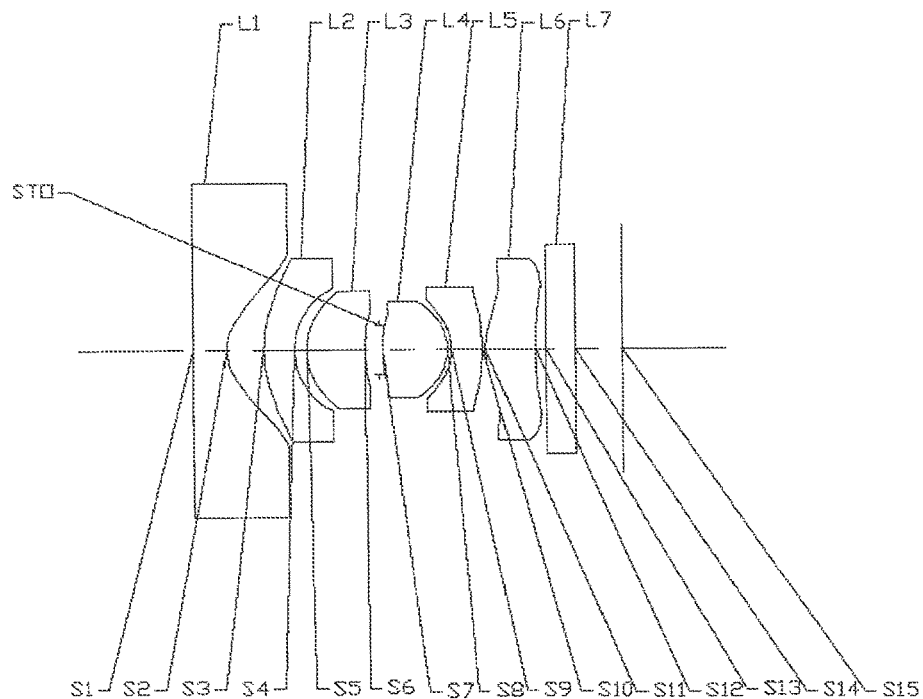
FIG. 21 is a schematic view showing an ultra-wide-angle lens assembly according to Embodiment 5 of the present disclosure.
Figure 22:
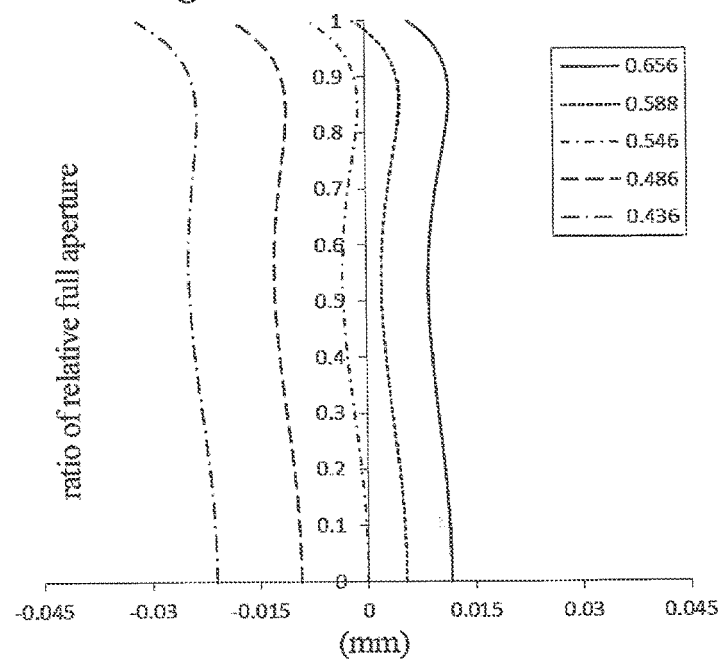
FIG. 22 is a diagram showing a longitudinal aberration curve (mm) of the ultra-wide-angle lens assembly in Embodiment 5.
Figure 23:
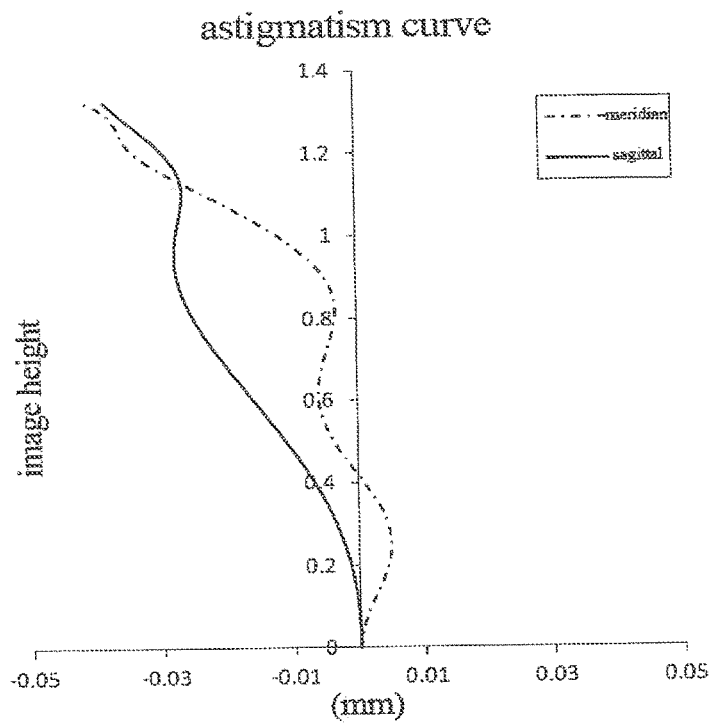
FIG. 23 is a diagram showing an astigmatism curve (mm) of the ultra-wide-angle lens assembly in Embodiment 5.
Figure 24:
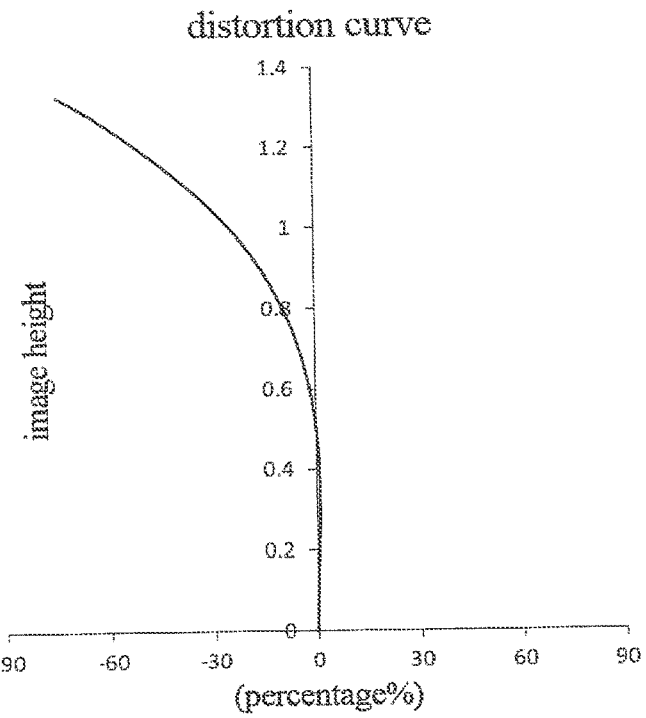
FIG. 24 is a diagram showing a distortion curve (%) of the ultra-wide-angle lens assembly in Embodiment 5.
Figure 25:
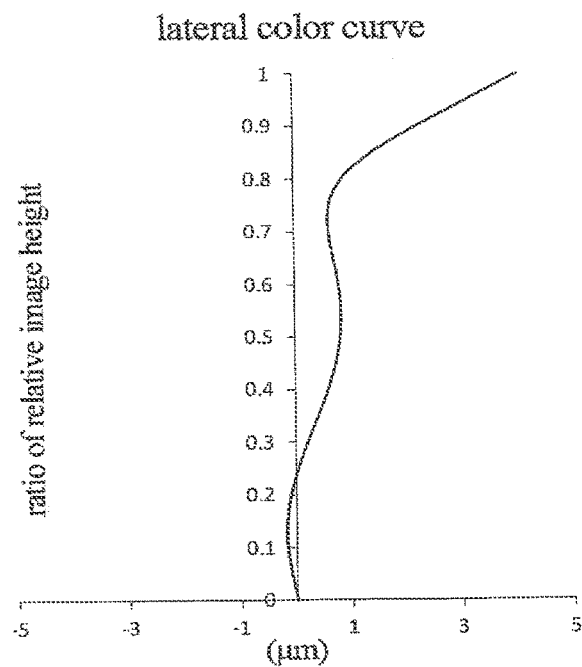
FIG. 25 is a diagram showing a lateral color curve (μm) of the ultra-wide-angle lens assembly in Embodiment 5.
Figure 26:
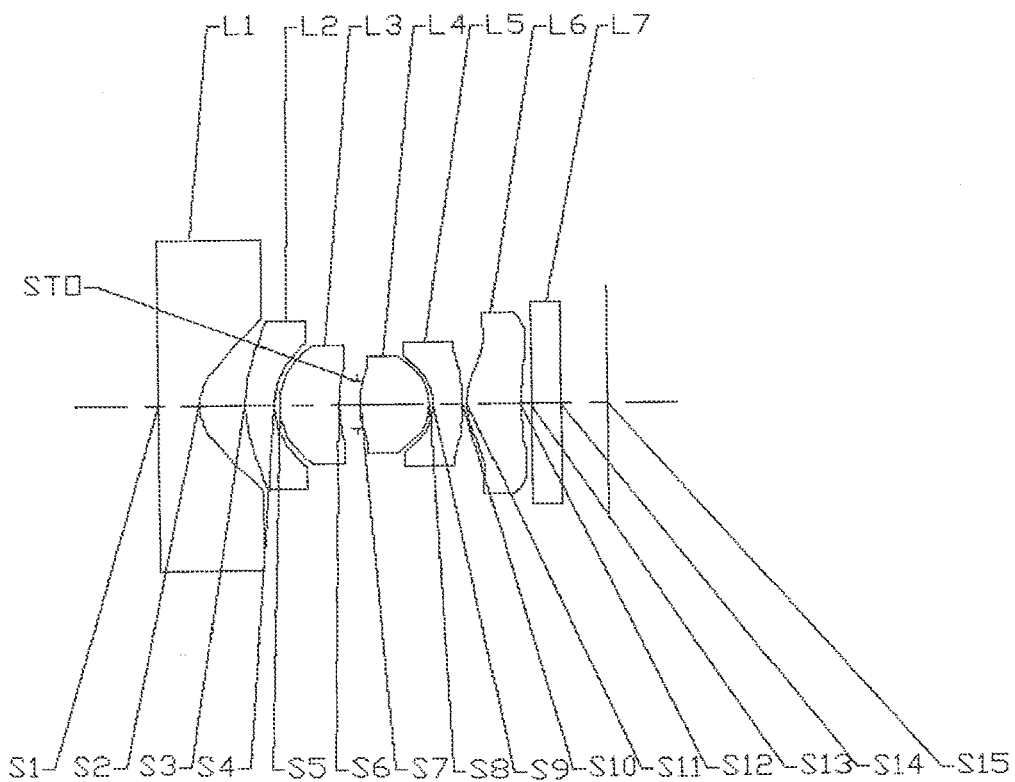
FIG. 26 is a schematic view showing an ultra-wide-angle lens assembly according to Embodiment 6 of the present disclosure.
Figure 27:
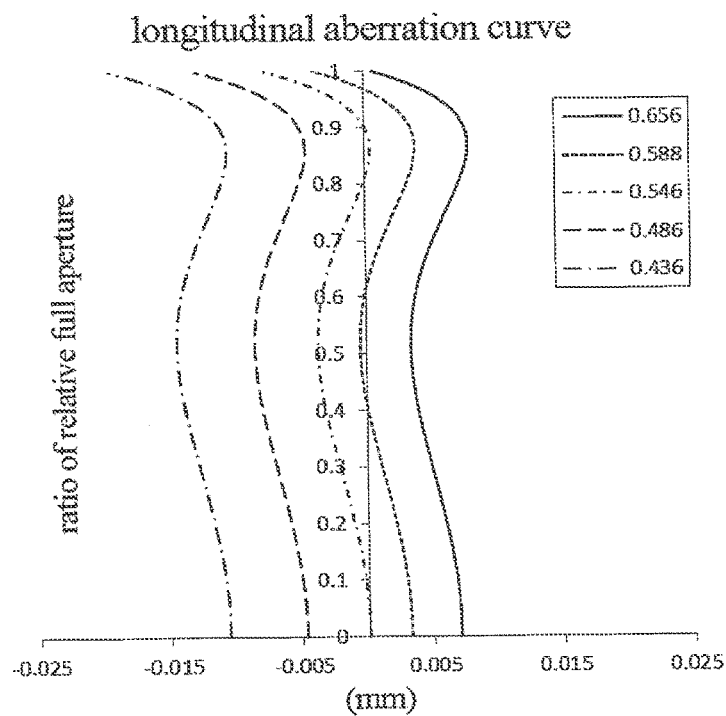
FIG. 27 is a diagram showing a longitudinal aberration curve (mm) of the ultra-wide-angle lens assembly in Embodiment 6.
Figure 28:
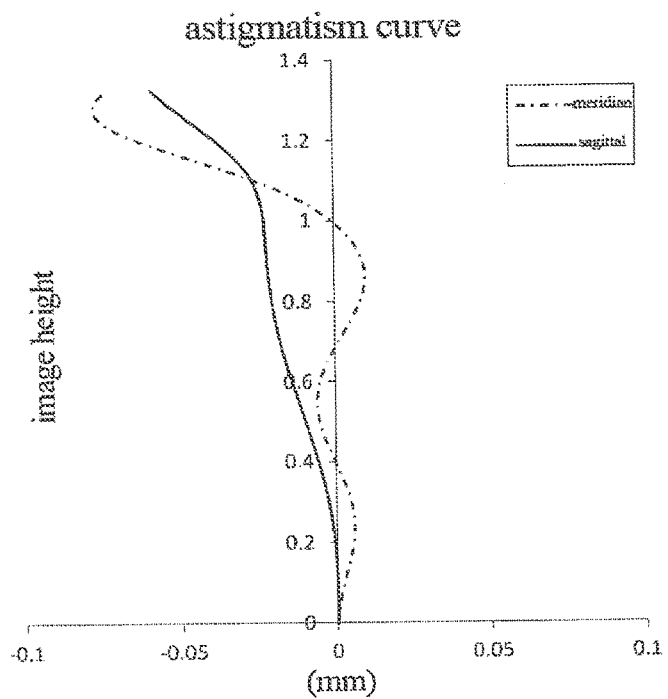
FIG. 28 is a diagram showing an astigmatism curve (mm) of the ultra-wide-angle lens assembly in Embodiment 6.
Figure 29:
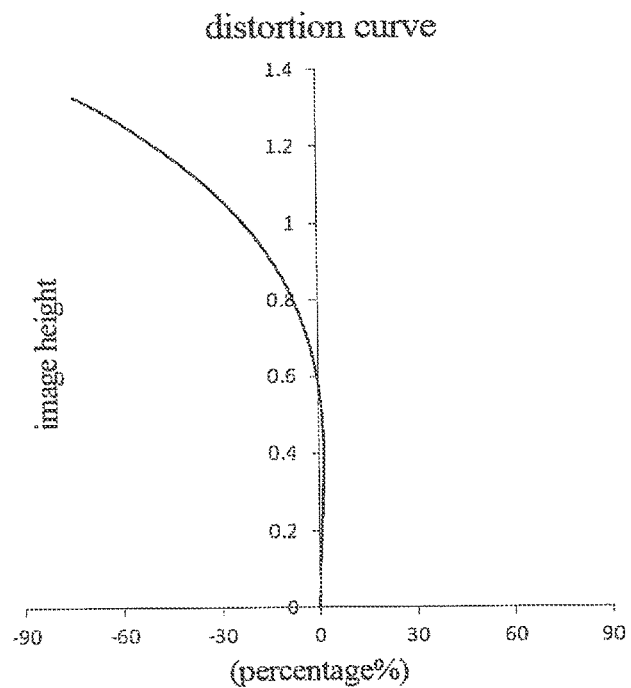
FIG. 29 is a diagram showing a distortion curve (%) of the ultra-wide-angle lens assembly in Embodiment 6.
Figure 30:
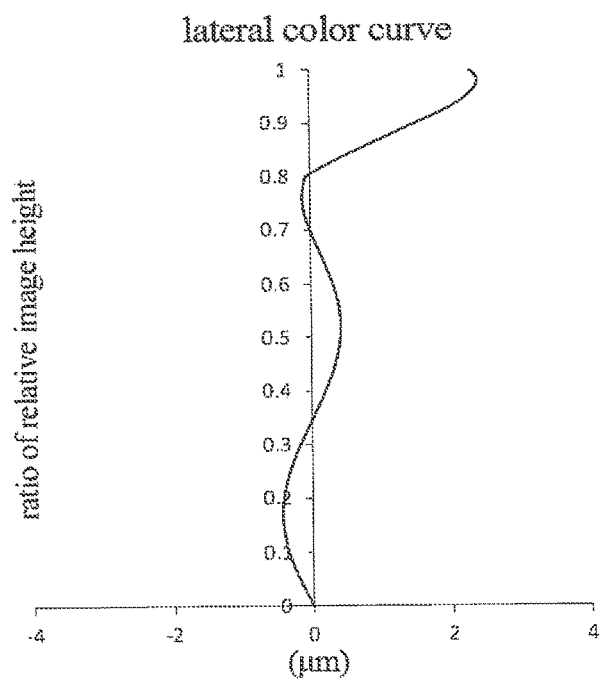
FIG. 30 is a diagram showing a lateral color curve (μm) of the ultra-wide-angle lens assembly in Embodiment 6.
Figure 31:
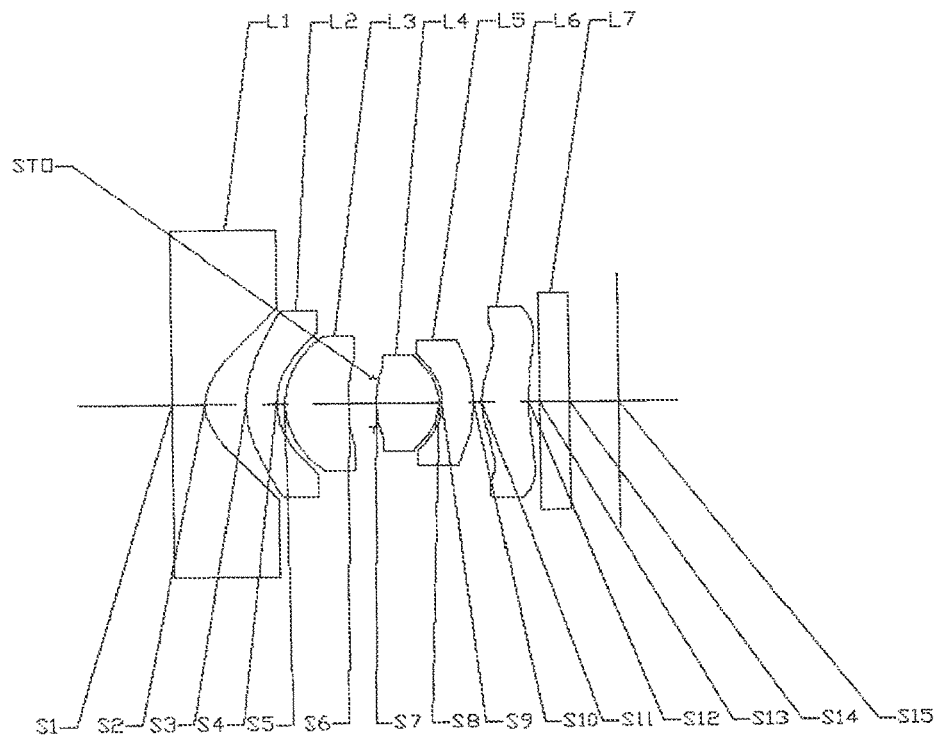
FIG. 31 is a schematic view showing an ultra-wide-angle lens assembly according to Embodiment 7 of the present disclosure.
Figure 32:
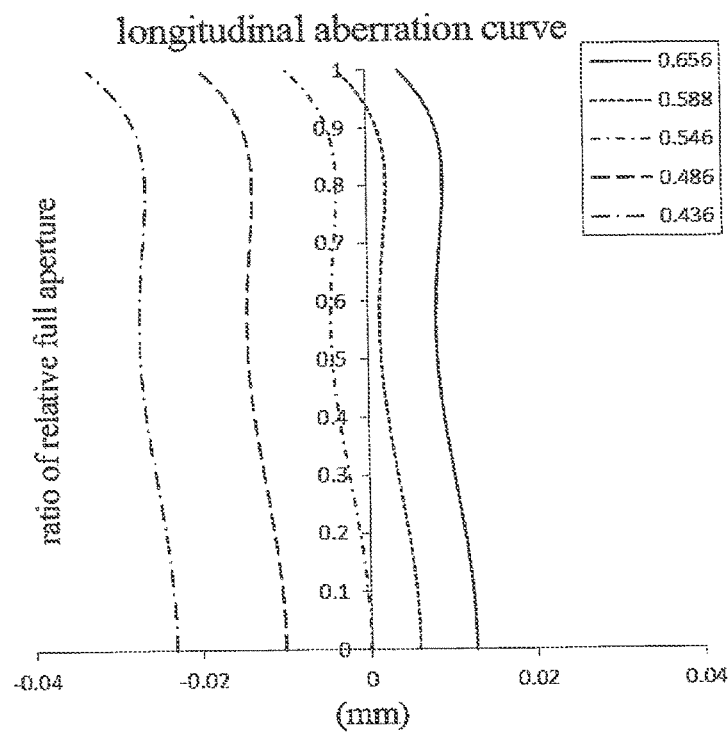
FIG. 32 is a diagram showing a longitudinal aberration curve (mm) of the ultra-wide-angle lens assembly in Embodiment 7.
Figure 33:
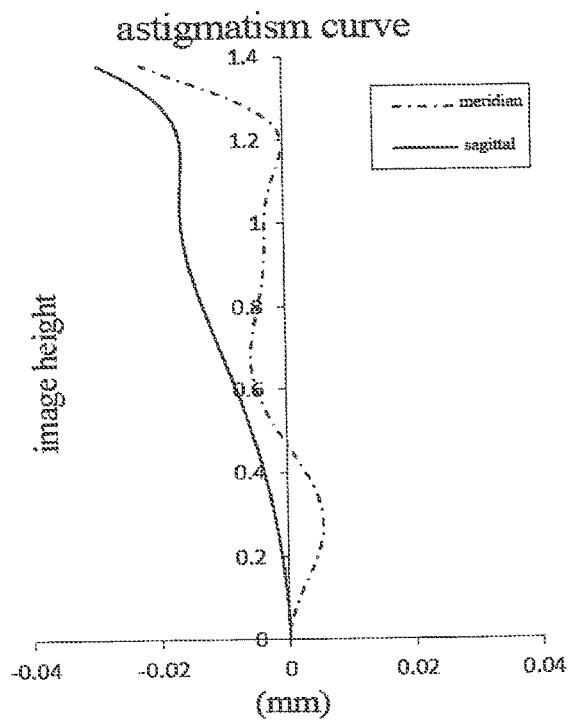
FIG. 33 is a diagram showing an astigmatism curve (mm) of the ultra-wide-angle lens assembly in Embodiment 7.
Figure 34:
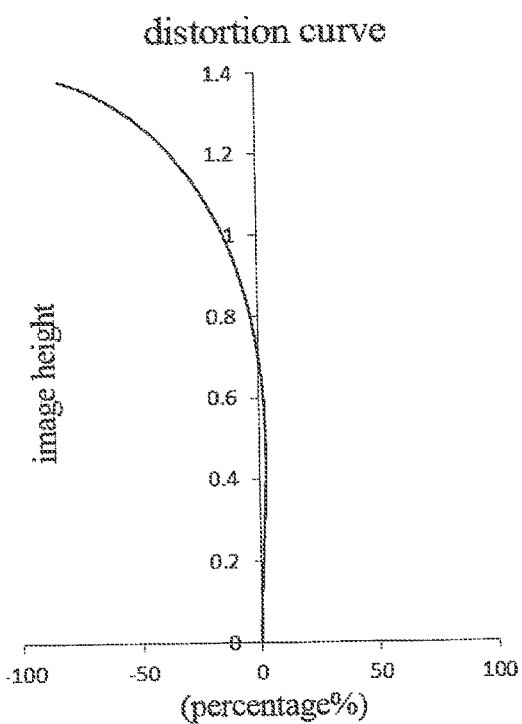
FIG. 34 is a diagram showing a distortion curve (%) of the ultra-wide-angle lens assembly in Embodiment 7.
Figure 35:
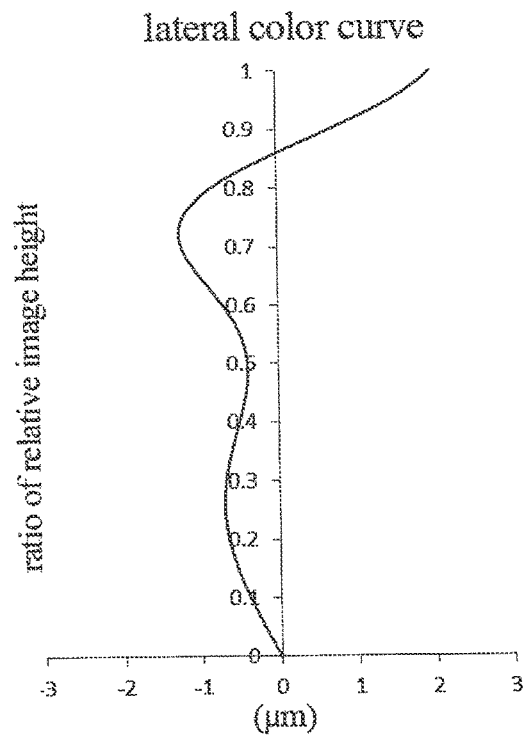
FIG. 35 is a diagram showing a lateral color curve (μm) of the ultra-wide-angle lens assembly in Embodiment 7.
Figure 36:
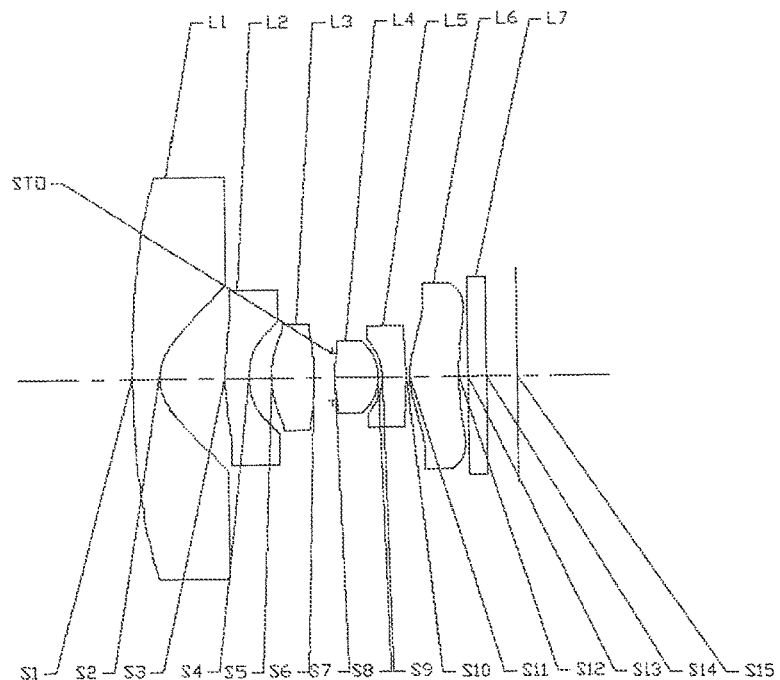
FIG. 36 is a schematic view showing an ultra-wide-angle lens assembly according to Embodiment 8 of the present disclosure.
Figure 37:
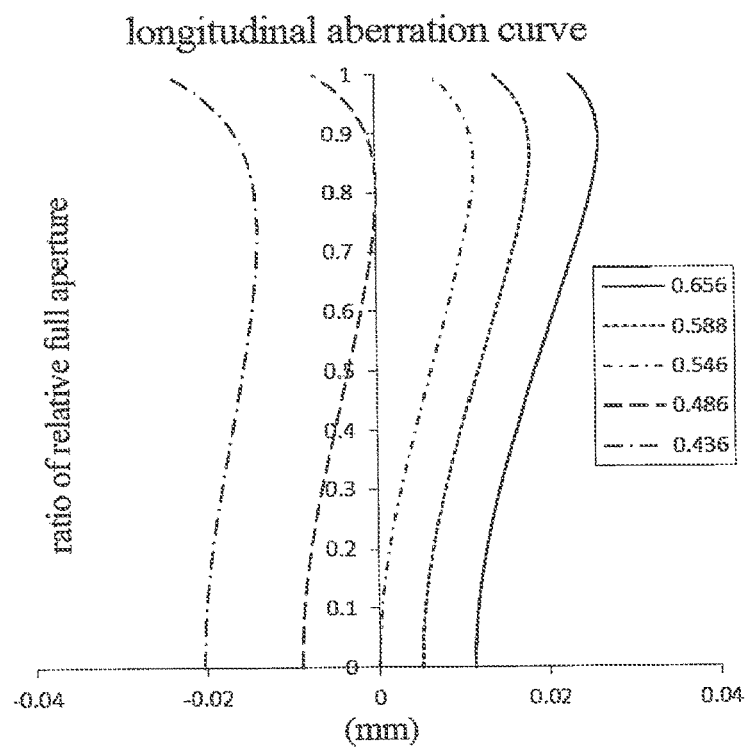
FIG. 37 is a diagram showing a longitudinal aberration curve (mm) of the ultra-wide-angle lens assembly in Embodiment 8.
Figure 38:
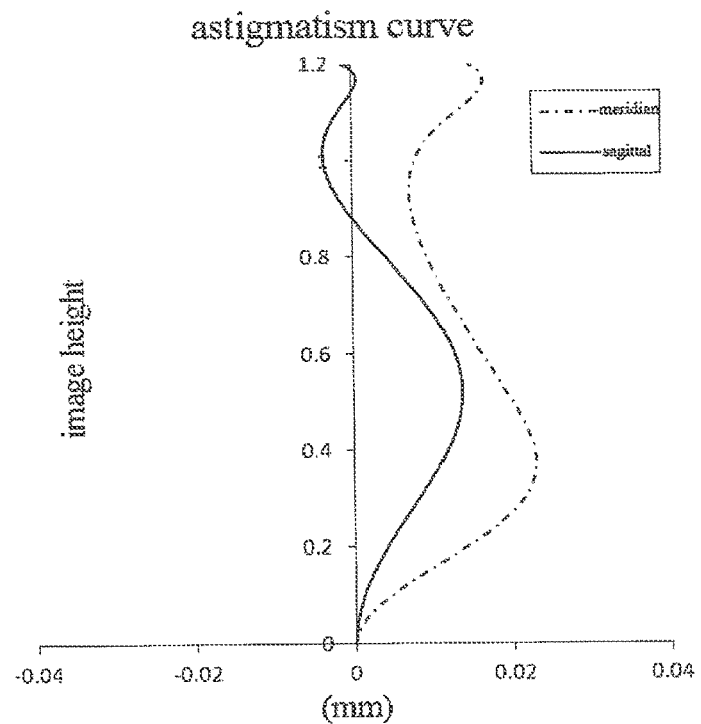
FIG. 38 is a diagram showing an astigmatism curve (mm) of the ultra-wide-angle lens assembly in Embodiment 8.
Figure 39:
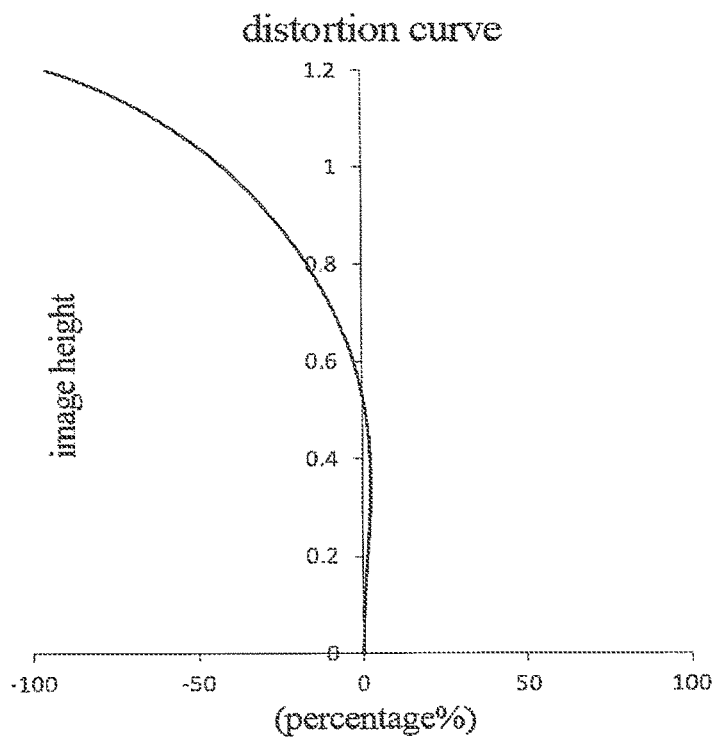
FIG. 39 is a diagram showing a distortion curve (%) of the ultra-wide-angle lens assembly in Embodiment 8.
Figure 40:
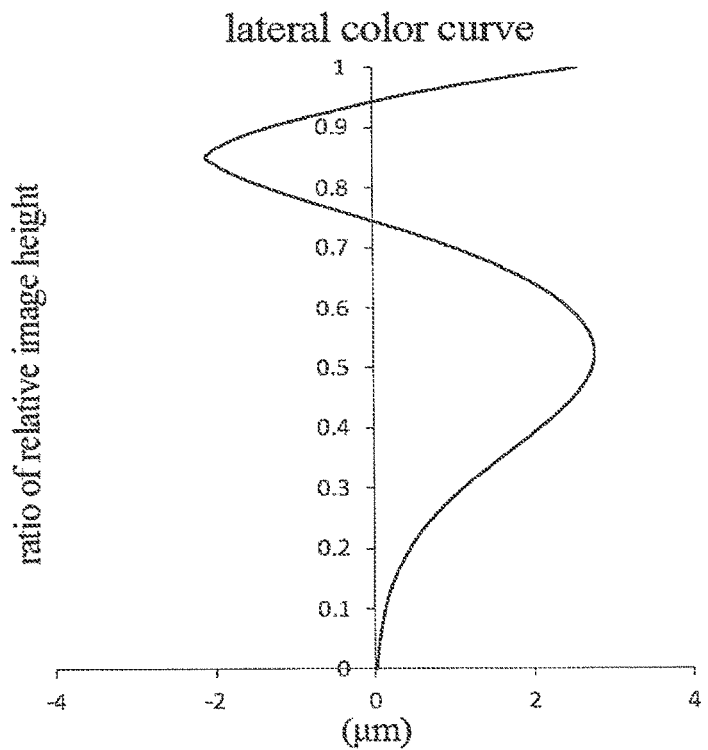
FIG. 40 is a diagram showing a lateral color curve (μm) of the ultra-wide-angle lens assembly in Embodiment 8.

Embodiments of the present disclosure will be described in detail in the following descriptions, examples of which are shown in the accompanying drawings, in which the same or similar reference numerals represent the same or similar elements or elements having the same or similar functions throughout the descriptions. The embodiments described hereinafter with reference to the accompanying drawings are explanatory and illustrative, which are used to generally understand the present disclosure, but shall not be construed to limit the present disclosure.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer,", "clockwise" and "counterclockwise" should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance or to imply the number of indicated technical features. Thus, the feature defined with "first" and "second" may explicitly or implicitly comprise one or more this feature. In the description of the present disclosure, unless specified otherwise, "a plurality of" means two or more than two.

In the description of the present disclosure, it should be noted that, unless otherwise clearly defined and limited, the terms "mounted", "connected", "connection" should be broadly understood, and may be, for example, fixed connections, detachable connections, or integral connections; may be mechanical connections, may also be electrical connections or may communicate with each other; may also be direct connections or indirect connections via intermediation; may also be inner communications or interaction relationship of two elements, which can be understood by those ordinary skilled in the art according to specific situations.

In the present disclosure, unless otherwise clearly defined and limited, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Various embodiments and examples are provided in the following descriptions to implement different structures of the present disclosure. In order to simplify the present disclosure, certain elements and settings will be described. However, these elements and settings are only by way of example and are not intended to limit the present disclosure. In addition, reference numerals and/or reference letters may be repeated in different examples in the present disclosure, this repeating is for the purpose of simplification and clarity and does not refer to relations between different embodiments and/or settings. Furthermore, examples of specific processes and materials are provided in the present disclosure, however, it would be appreciated by those ordinary skilled in the art that other processes and/or materials may be also applied.

With reference to FIG. 1, the ultra-wide-angle lens assembly according to an embodiment of the present disclosure includes a first lens L1 being of a negative refractive power, a second lens L2 being of a refractive power, a third lens L3 being of a positive refractive power, a fourth lens L4 being of a positive refractive power, a fifth lens L5 being of a negative refractive power and a sixth lens L6 being of a positive refractive power from an object side of the ultra-wide-angle lens assembly to an image side of the ultra-wide-angle lens assembly in turn, The first lens L1 has an object side surface S1 and an image side surface S2; the second lens L2 has an object side surface S3 and an image side surface S4, in which the object side surface S3 is convex and the image side surface S4 is concave; the third lens L3 has an object side surface S5 and an image side surface S6, in which the object side surface S5 is convex; the fourth lens L4 has an object side surface S7 and an image side surface S8; the fifth lens L5 has an object side surface S9 and an image side surface S10; and the sixth lens L6 has an object side surface S11 and an image side surface S12, in which the image side surface S12 has a proximal portion in relative to an optical axis in a concave shape.

During imaging, light enters the ultra-wide-angle lens assembly and then is imaged at an imaging side surface S15 after passing through a light filter L7 including an object side surface S13 and an image side surface S14.

The ultra-wide-angle lens assembly meets the following formulas:

$$|\tan(HFOV)|/TTL > 0.9 \text{ mm}^{-1}; \text{ and}$$

$$-2.0 < f1/f < 0,$$

in which

HFOV equals to half of a maximum field angle of the ultra-wide-angle lens assembly, TTL represents a total length of the ultra-wide-angle lens assembly, f1 represents an effective focal length of the first lens, and f represents an effective focal length of the ultra-wide-angle lens assembly.

Meeting the above configurations is conducive to miniaturizing the ultra-wide-angle lens assembly and expanding the field angle at the same time, realizing the ultra-wide-angle characteristic, modifying various kinds of aberrations, and improving of the imaging quality.

The first lens L1 may be made of a glass or plastic material. In the case that the first lens L1 is made of the glass material, the first lens L1 has low sensitivity to temperature difference and a strong environmental adaptability. In the case that the first lens L1 is made of the plastic material, the first lens L1 is easy to be manufactured with low cost.

The image side surface S2, of the first lens L1 is concave, and the ultra-wide-angle lens assembly meets the following formula:

$$1 < SAG12/CT1 < 2.5,$$

in which

SAG12 represents a horizontal displacement from an intersection of the image side surface S2 of the first lens L1 and the optic axis to a maximum effective radius of the image side surface S2 of the first lens; and CT1 represents a thickness of the first lens L1 in a direction along the optic axial.

Meeting the requirement in the above formula contributes to further improving the field angle of the ultra-wide-angle lens assembly and optimizing the characteristics of the ultra-wide-angle lens assembly.

The ultra-wide-angle lens assembly meets the following formula:

$$-0.2 < f/f2 < 0,$$

in which f2 represents an effective focal length of the second lens L2, and

Meeting the requirement in above formula contributes to reasonable distribution of focal powers of the ultra-wide-angle lens assembly and effective modification of various aberrations of the ultra-wide-angle lens assembly.

In the ultra-wide-angle lens assembly, the image side surface S8 of the fourth lens L4 is convex, the object side surface S9 of the fifth lens L5 is concave, and the ultra-wide-angle lens assembly meets the following formula:

$$|(R8-R9)/(R8+R9)| < 0.1,$$

in which

R8 represents a curvature radius of the image side surface S8 of the fourth lens L4, and R9 represents a curvature radius of the object side surface S9 of the fifth lens L5.

Meeting the requirement in above formula contributes to lens spaces, further shortening the total length of the ultra-wide-angle lens assembly, and ensuring the miniaturization of the ultra-wide-angle lens assembly.

The ultra-wide-angle lens assembly meets the following formula:

$$0.5 < R4/R5 < 1.5,$$

in which

R4 represents a curvature radius of the image side surface S4 of the second lens L2, and R5 represents a curvature radius of the object side surface S5 of the third lens L3.

Meeting the requirement in above formula contributes to improving the imaging quality of the ultra-wide-angle lens assembly, thus enabling the ultra-wide-angle lens assembly to have a relatively uniform imaging quality from a center to an edge of the ultra-wide-angle lens assembly.

In the ultra-wide-angle lens assembly, the image side surface S12 of the sixth lens L6 includes at least one point of inflection and the ultra-wide-angle lens assembly meets the following formula:

$$0.5 < Yc62/ImgH < 1,$$

in which

Yc62 represents a vertical distance from the point of inflection on the image side surface S12 of the sixth lens L6 to the optic axis, and ImgH represents a half-length of a diagonal of an effective pixel region at the imaging side surface S15 of the ultra-wide-angle lens assembly.

When the image side surface S12 includes a plurality of points of inflection, Yc62 represents a vertical distance from each point of inflection to the optic axis, that is, the vertical distance from each point of inflection to the optic axis is Yc62, so all the vertical distances meet above formula.

Meeting the requirement in above formula contributes to correcting incidence angles of main lights on imaging side surfaces, improving matching degrees to chips, and ensuring brightness uniformity on the entire imaging side surface S15.

The ultra-wide-angle lens assembly meets the following formula:

$$1.5 < f45/f < 6.0,$$

in which f45 represents a combined focal length of the fourth lens L4 and the fifth lens L5, and f represents the effective focal length of the ultra-wide-angle lens assembly.

Meeting the requirement in above formula contributes to modifying various aberrations of the ultra-wide-angle lens assembly and improving the imaging quality of the ultra-wide-angle lens assembly.

The ultra-wide-angle lens assembly includes an aperture stop STO arranged between the third lens L3 and the fourth lens L4.

The image side surface S6 of the third lens L3 is concave, and the object side surface S11 of the sixth lens L6 has a proximal portion in relative to the optical axis in a convex shape.

The object side surface S7 of the fourth lens L4 is convex, and an image side surface S10 of the fifth lens L5 is convex.

The ultra-wide-angle lens assembly meeting above configurations and shapes may be further modified with various aberrations, guaranteed with sufficient relative illumination at an edge of the imaging side surface, improved with high imaging quality; at the same time, each lens has a well-proportioned shape which enables the ultra-wide-angle lens assembly to be of a relatively compact construction, thereby contributing to miniaturization of the ultra-wide-angle lens assembly.

In some embodiments, the first lens L1, the second lens L2, the third lens L3, the fourth lens L4, the fifth lens L5 and the sixth lens L6 are all aspheric shape lenses.

A surface shape of the aspheric shape is defined by a formula as below:

$$x = \frac{ch^2}{1 + \sqrt{1 - (k+1)c^2 h^2}} + \sum A_i h^i$$

in which h is a height from any point on the aspheric shape to the optic axis, c is an apex curvature, k is a conic coefficient, Ai is a correction coefficient for the i-th order of the aspheric.

Embodiment 1

In embodiment 1, the ultra-wide-angle lens assembly meets the conditions in the following tables:

TABLE 1

| Surface | Surface type | Curvature radius | Thickness | refractive index/abbe | Conic coefficient |
|---------|--------------|------------------|-----------|----------------------|-------------------|
| Obj | spherical | infinity | infinity | | |
| S1 | spherical | infinity | 0.3574 | 1.59/61.1 | |
| S2 | aspheric | 0.5157 | 0.4135 | | −1.3504 |
| S3 | aspheric | 1.2255 | 0.3000 | 1.544/56.11 | 0.0000 |
| S4 | aspheric | 0.9551 | 0.1224 | | −0.5881 |
| S5 | aspheric | 0.8798 | 0.6396 | 1.635/23.78 | −0.2070 |
| S6 | aspheric | 4.4368 | 0.2213 | | 0.0000 |
| STO | spherical | infinity | 0.0300 | | |
| S7 | aspheric | 1.4890 | 0.5707 | 1.544/56.11 | 2.1806 |
| S8 | aspheric | −0.6397 | 0.0400 | | −0.3297 |
| S9 | aspheric | −0.6707 | 0.3000 | 1.635/23.78 | −0.0157 |
| S10 | aspheric | −2.4218 | 0.0507 | | −4.6372 |
| S11 | aspheric | 0.9891 | 0.4866 | 1.544/56.11 | −9.0932 |
| S12 | aspheric | 14.4090 | 0.1000 | | 0.0000 |
| S13 | spherical | infinity | 0.3000 | 1.517/64.17 | |
| S14 | spherical | infinity | 0.4595 | | |
| S15 | spherical | infinity | | | |

TABLE 2

| Surface | A4 | A6 | A8 | A10 | A12 | A14 |
|---|---|---|---|---|---|---|
| S2 | −9.9172E−02 | 2.8514E−02 | −2.9021E−02 | −4.2702E−02 | 3.9042E−02 | 9.8351E−13 |
| S3 | −1.3628E−01 | −1.1357E−02 | −5.7836E−02 | 1.6253E−02 | −8.6189E−05 | 0 |
| S4 | 4.0363E−01 | −7.0194E−01 | 1.1299E−01 | 7.8625E−02 | −5.7448E−06 | 0 |
| S5 | 2.5415E−02 | −2.4421E−01 | −1.0293E−01 | 6.9314E−01 | 0.0000E+00 | 0 |
| S6 | 3.3253E−01 | 1.6177E+00 | −4.1023E+00 | 1.8028E+01 | 0 | 0 |
| S7 | 6.9218E−02 | −2.6313E+00 | 2.3728E+01 | −8.4116E+01 | 0 | 0 |
| S8 | −7.9747E−01 | 1.2212E+00 | −4.5922E+00 | 2.6859E+01 | 0 | 0 |
| S9 | −2.7167E−02 | −3.5808E+00 | 6.9215E+00 | 2.8714E+01 | 0 | 0 |
| S10 | −3.8647E−01 | 3.8917E−01 | −4.3885E−02 | 1.6352E+00 | 0 | 0 |
| S11 | 6.0865E−02 | −4.0903E−01 | 0.2457723 | −3.8667E−02 | 5.41045E−05 | 0 |
| S12 | 4.0270E−01 | −8.1912E−01 | 5.8324E−01 | −1.8875E−01 | 3.6446E−06 | 0 |

In addition, f1=−0.88 mm; f2=−13.03 mm; f3=1.60 mm; f4=0.91 mm; f5=−1.55 mm; f6=1.92 mm and f=0.67 mm; HFOV=85°; TTL=4.39 mm; Fno: 2.4.

Embodiment 2

In embodiment 2, the ultra-wide-angle lens assembly meets the conditions in the following tables:

TABLE 3

| Surface | Surface type | Curvature radius | Thickness | refractive index/abbe | Conic coefficient |
|---|---|---|---|---|---|
| Obj | spherical | infinity | infinity | | |
| S1 | spherical | infinity | 0.3238 | 1.59/61.1 | |
| S2 | aspheric | 0.5119 | 0.3867 | | −1.3962 |
| S3 | aspheric | 1.2424 | 0.3000 | 1.54/56.1 | 0.0000 |
| S4 | aspheric | 0.9648 | 0.0799 | | −0.4527 |
| S5 | aspheric | 0.8523 | 0.6026 | 1.64/23.78 | −0.0855 |
| S6 | aspheric | 3.2954 | 0.2274 | | −0.5914 |
| STO | spherical | infinity | 0.0406 | | |
| S7 | aspheric | 1.3560 | 0.6506 | 1.54/56.1 | 1.0169 |
| S8 | aspheric | −0.6344 | 0.0251 | | −0.3440 |
| S9 | aspheric | −0.6651 | 0.3000 | 1.64/23.78 | −0.0316 |
| S10 | aspheric | −2.2309 | 0.0861 | | −0.3613 |
| S11 | aspheric | 0.9300 | 0.4700 | 1.54/56.1 | −7.9217 |
| S12 | aspheric | 5.7113 | 0.1000 | | −0.0089 |
| S13 | spherical | infinity | 0.3000 | 1.52/64.2 | |
| S14 | spherical | infinity | 0.4914 | | |
| S15 | spherical | infinity | | | |

TABLE 4

| Surface | A4 | A6 | A8 | A10 | A12 |
|---|---|---|---|---|---|
| S2 | −7.4983E−02 | 2.5011E−02 | −3.3921E−02 | −4.9522E−02 | 3.9042E−02 |
| S3 | −1.3216E−01 | 9.2503E−03 | −4.1568E−02 | −3.5211E−03 | −8.6189E−05 |
| S4 | 4.3048E−01 | −5.7002E−01 | 1.7610E−01 | −2.8370E−01 | −5.7448E−06 |
| S5 | 4.2869E−02 | −1.7875E−01 | −1.4743E−01 | 7.7190E−03 | 0 |
| S6 | 2.9039E−01 | 1.4188E+00 | −6.6114E+00 | 1.8928E+01 | 0 |
| S7 | −2.4893E−02 | −1.5151E+00 | 1.7356E+01 | −6.1575E+01 | 0 |
| S8 | −8.5760E−01 | 1.3505E+00 | −5.1482E+00 | 3.0143E+01 | 0 |
| S9 | −4.8903E−02 | −3.6822E+00 | 7.3994E+00 | 2.4921E+01 | 0 |
| S10 | −3.9631E−01 | 3.2211E−01 | −2.2636E−01 | 1.5431E+00 | 0 |
| S11 | 4.0771E−02 | −4.7547E−01 | 1.7028E−01 | −1.0261E−01 | 5.4105E−05 |
| S12 | 3.3345E−01 | −8.6249E−01 | 5.7795E−01 | −1.7879E−01 | 3.6446E−06 |

In addition, f1=−0.88 mm; f2=−12.85 mm; f3=1.67 mm; f4=0.90 mm; f5=−1.63 mm; f6=1.98 mm; f=0.70 mm; HFOV=85°; TTL=4.38 mm; Fno: 2.4.

Embodiment 3

In embodiment 3, the ultra-wide-angle lens assembly meets the conditions in the following tables:

TABLE 5

| Surface | Surface type | Curvature radius | Thickness | refractive index/abbe | Conic coefficient |
|---|---|---|---|---|---|
| Obj | spherical | infinity | infinity | | |
| S1 | spherical | 300.0000 | 0.3666 | 1.544/56.11 | |
| S2 | aspheric | 0.5432 | 0.3963 | | −1.4773 |
| S3 | aspheric | 1.3598 | 0.3000 | 1.544/56.11 | 0.0000 |
| S4 | aspheric | 0.7779 | 0.1283 | | −0.2283 |
| S5 | aspheric | 0.8094 | 0.5799 | 1.636/23.78 | −0.4343 |
| S6 | aspheric | 3.8718 | 0.2253 | | −27.0356 |
| STO | spherical | infinity | 0.0352 | | |
| S7 | aspheric | 1.2622 | 0.6285 | 1.544/56.11 | 0.6342 |
| S8 | aspheric | −0.5978 | 0.0450 | | −0.5923 |
| S9 | aspheric | −0.6318 | 0.3000 | 1.636/23.78 | 0.0115 |
| S10 | aspheric | −2.7575 | 0.0900 | | 0.0000 |
| S11 | aspheric | 0.9297 | 0.4387 | 1.544/56.11 | −8.6483 |
| S12 | aspheric | 6.1047 | 0.1000 | | −2.9345 |
| S13 | spherical | infinity | 0.3000 | 1.517/64.17 | |
| S14 | spherical | infinity | 0.4603 | | |
| S15 | spherical | infinity | | | |

TABLE 6

| Surface | A4 | A6 | A8 | A10 | A12 | A14 |
|---|---|---|---|---|---|---|
| S2 | −1.3411E−01 | 3.1053E−02 | −1.6828E−02 | −2.9281E−02 | 4.0705E−02 | 3.2771E−08 |
| S3 | −1.7619E−01 | −3.7491E−03 | −1.9761E−02 | 2.7758E−02 | −8.6189E−05 | 0 |
| S4 | 5.5907E−01 | −1.1042E+00 | −4.7411E−01 | 1.7937E−01 | −5.7448E−06 | 0 |
| S5 | 1.8223E−01 | −5.7944E−01 | −9.2563E−02 | 7.6351E−01 | 0 | 0 |
| S6 | 2.2661E−01 | 1.0865E+00 | −4.1166E+00 | 1.4752E+01 | 0 | 0 |
| S7 | −7.9294E−03 | −2.3526E+00 | 2.4617E+01 | −8.5124E+01 | 0 | 0 |
| S8 | −6.2805E−01 | 1.6939E+00 | −6.8364E+00 | 3.1985E+01 | 0 | 0 |
| S9 | −4.9216E−02 | −3.1238E+00 | 9.5958E+00 | 2.7631E+01 | 0 | 0 |
| S10 | −5.5555E−01 | 4.1482E−01 | −8.8094E−02 | 1.7699E+00 | 0 | 0 |
| S11 | 7.8739E−02 | −5.9737E−01 | 2.0580E−01 | −1.0726E−01 | 5.4105E−05 | 0 |
| S12 | 3.6956E−01 | −9.3135E−01 | 6.3602E−01 | −2.0196E−01 | 3.6446E−06 | 0 |

In addition, f1=−1.01 mm; f2=−4.1 mm; f3=1.52 mm; f4=0.85 mm; f5=−1.38 mm; f6=1.97 mm; f=0.71 mm; HFOV=86°; TTL=3.98 mm; Fno: 2.4.

Embodiment 4

In embodiment 4, the ultra-wide-angle lens assembly meets the conditions in the following tables:

TABLE 7

| Surface | Surface type | Curvature radius | Thickness | refractive index/abbe | Conic coefficient |
|---|---|---|---|---|---|
| Obj | spherical | infinity | infinity | | |
| S1 | spherical | 300.0000 | 0.3200 | 1.544/56.11 | |
| S2 | aspheric | 0.4864 | 0.2852 | | −1.4919 |
| S3 | aspheric | 1.0974 | 0.3000 | 1.544/56.11 | −0.3066 |
| S4 | aspheric | 0.6604 | 0.0979 | | −0.2683 |
| S5 | aspheric | 0.6450 | 0.6427 | 1.636/23.78 | −0.3332 |
| S6 | aspheric | 3.2120 | 0.1203 | | −99.9900 |
| STO | spherical | infinity | 0.0300 | | |
| S7 | aspheric | 1.7295 | 0.5606 | 1.544/56.11 | 3.9319 |
| S8 | aspheric | −0.4983 | 0.0400 | | −0.9357 |
| S9 | aspheric | −0.5074 | 0.3000 | 1.636/23.78 | −0.1667 |
| S10 | aspheric | −0.8783 | 0.0300 | | −5.4949 |
| S11 | aspheric | 1.5498 | 0.4033 | 1.544/56.11 | −4.7073 |
| S12 | aspheric | 9.5294 | 0.1000 | | 52.8395 |
| S13 | spherical | infinity | 0.2100 | 1.517/64.17 | |
| S14 | spherical | infinity | 0.4095 | | |
| S15 | spherical | infinity | | | |

TABLE 8

| Surface | A4 | A6 | A8 | A10 | A12 |
|---|---|---|---|---|---|
| S2 | 4.5313E−02 | −1.9637E−01 | −5.1024E−02 | 1.1733E−02 | 1.8233E−03 |
| S3 | −1.2569E−01 | −6.8782E−02 | −7.3008E−02 | 1.0971E−01 | −8.6189E−05 |
| S4 | 6.0290E−01 | −1.3272E+00 | −4.0159E−01 | −2.2340E+00 | −5.7448E−06 |
| S5 | 1.0334E−01 | −6.8620E−01 | 3.1447E−01 | 9.9979E−01 | −1.2621E−14 |
| S6 | 1.0492E+00 | 6.0495E+00 | −4.5179E+02 | 3.0739E+02 | −1.4324E−15 |
| S7 | 8.2724E−02 | 2.9736E+00 | −1.6005E+01 | 6.3103E+01 | −1.4380E−15 |
| S8 | −2.5139E−01 | 5.0583E−02 | −6.4655E+00 | 7.6174E+01 | −1.4083E−15 |
| S9 | 1.1052E+00 | −2.5964E+00 | 1.1675E+01 | 4.6912E+01 | −3.5621E−15 |
| S10 | −5.3796E−01 | 7.6304E−01 | 2.7050E−01 | 1.5996E+00 | −1.5247E−14 |
| S11 | −6.6855E−02 | −3.3042E−01 | 3.1344E−01 | −6.2500E−02 | 5.4105E−05 |
| S12 | 3.7267E−01 | −8.7957E−01 | 6.8108E−01 | −2.2370E−01 | 3.6446E−06 |

| Surface | A14 | A16 | A18 | A20 | A22 | A24 | A26 |
|---|---|---|---|---|---|---|---|
| S2 | 1.1124E−02 | 1.5346E−02 | −1.5938E−02 | 6.3531E−03 | 4.7499E−02 | −7.5086E−03 | 4.5455E−03 |

In addition, f1=−0.89 mm; f2=−4.01 mm; f3=1.15 mm; f4=0.78 mm; f5=−2.74 mm; f6=3.33 mm; f=0.64 mm; HFOV=75°; TTL=3.85 mm; Fno: 2.4.

Embodiment 5

In embodiment 5, the ultra-wide-angle lens assembly meets the conditions in the following tables:

TABLE 9

| Surface | Surface type | Curvature radius | Thickness | refractive index/abbe | Conic coefficient |
|---|---|---|---|---|---|
| Obj | spherical | infinity | infinity | | |
| S1 | spherical | 1000.0000 | 0.3200 | 1.544/56.11 | |
| S2 | aspheric | 0.5364 | 0.3633 | | −1.3257 |
| S3 | aspheric | 1.3913 | 0.3000 | 1.544/56.11 | 0.0000 |
| S4 | aspheric | 0.8886 | 0.1197 | | −0.0992 |
| S5 | aspheric | 0.7869 | 0.5770 | 1.636/23.78 | −0.1869 |
| S6 | aspheric | 2.5534 | 0.1397 | | −9.0667 |
| STO | spherical | infinity | 0.0300 | | |
| S7 | aspheric | 1.3271 | 0.6345 | 1.544/56.11 | 0.1786 |
| S8 | aspheric | −0.6207 | 0.0400 | | −0.4239 |
| S9 | aspheric | −0.6681 | 0.3000 | 1.636/23.78 | −0.1470 |
| S10 | aspheric | −2.5775 | 0.0300 | | −13.9321 |
| S11 | aspheric | 0.8887 | 0.4858 | 1.544/56.11 | −8.3025 |
| S12 | aspheric | 4.9286 | 0.1000 | | 6.2475 |
| S13 | spherical | infinity | 0.3000 | 1.517/64.17 | |
| S14 | spherical | infinity | 0.4624 | | |
| S15 | spherical | infinity | | | |

TABLE 10

| Surface | A4 | A6 | A8 | A10 | A12 |
|---|---|---|---|---|---|
| S2 | −1.1127E−01 | −2.7183E−02 | −0.031997176 | −4.7108E−02 | 3.9866E−02 |
| S3 | −1.5740E−01 | 2.4791E−02 | 5.4032E−02 | −7.3181E−02 | −8.61889E−05 |
| S4 | 4.5629E−01 | −5.2977E−01 | 3.7768E−01 | 1.5592E+00 | −5.74482E−06 |
| S5 | 1.4911E−01 | −4.2125E−01 | 1.0204E+00 | 3.6913E−01 | 0 |
| S6 | 3.8063E−01 | 2.5290E+00 | −5.8053E+00 | −5.4092E−01 | 0 |
| S7 | −7.5592E−02 | −1.6837E+00 | 6.3882E+00 | −3.3940E+01 | 0 |
| S8 | −9.8349E−01 | 1.9202E+00 | −7.9478E+00 | 2.3636E+01 | 0 |
| S9 | 1.4230E−01 | −4.2351E+00 | 6.8686E+00 | 2.8707E+01 | 0 |
| S10 | −3.2943E−01 | 2.8553E−01 | −3.7439E−01 | 2.2575E+00 | 0 |
| S11 | 1.0809E−01 | −5.1206E−01 | 2.2963E−01 | −1.5614E−01 | 5.41045E−05 |
| S12 | 2.9762E−01 | −8.4046E−01 | 5.4442E−01 | −1.9382E−01 | 3.6446E−06 |

In addition, f1=−0.98 mm; f2=−5.7 mm; f3=1.57 mm; f4=0.87 mm; f5=−1.50 mm; f6=1.9 mm; f=0.73 mm; HFOV=82°; TTL=4.20 mm; Fno: 2.4.

Embodiment 6

In embodiment 6, the ultra-wide-angle lens assembly meets the conditions in the following tables:

TABLE 11

| Surface | Surface type | Curvature radius | Thickness | refractive index/abbe | Conic coefficient |
|---|---|---|---|---|---|
| Obj | spherical | infinity | infinity | | |
| S1 | spherical | 1000.0000 | 0.4331 | 1.544/56.11 | |
| S2 | aspheric | 0.5451 | 0.4623 | | −1.2711 |
| S3 | aspheric | 1.4562 | 0.3000 | 1.544/56.11 | 0.0000 |
| S4 | aspheric | 1.0149 | 0.0493 | | −0.2984 |
| S5 | aspheric | 0.8816 | 0.6109 | 1.636/23.78 | −0.1656 |
| S6 | aspheric | 2.2406 | 0.1814 | | −13.0213 |
| STO | spherical | infinity | 0.0300 | | |
| S7 | aspheric | 1.1281 | 0.7193 | 1.544/56.11 | 0.2252 |
| S8 | aspheric | −0.6332 | 0.0404 | | −0.4280 |
| S9 | aspheric | −0.6021 | 0.3000 | 1.636/23.78 | −0.2171 |
| S10 | aspheric | −2.9247 | 0.0463 | | −7.3855 |
| S11 | aspheric | 0.7901 | 0.5525 | 1.544/56.11 | −6.6397 |
| S12 | aspheric | 6.5636 | 0.1000 | | 33.1161 |
| S13 | spherical | infinity | 0.3000 | 1.517/64.17 | |
| S14 | spherical | infinity | 0.4765 | | |
| S15 | spherical | infinity | | | |

TABLE 12

| Surface | A4 | A6 | A8 | A10 | A12 |
|---|---|---|---|---|---|
| S2 | −8.8292E−02 | 2.2344E−03 | −3.1766E−02 | −4.4686E−02 | 4.3867E−02 |
| S3 | −1.8545E−01 | −8.7216E−03 | 4.6941E−02 | −1.5637E−02 | −8.6189E−05 |
| S4 | 3.8914E−01 | −5.6268E−01 | 2.4546E−01 | 3.1177E−01 | −5.7448E−06 |
| S5 | 2.2824E−01 | −5.0384E−01 | 1.0103E+00 | −4.5830E−02 | 0 |
| S6 | 3.3483E−01 | 1.7370E+00 | −4.0809E+00 | 7.1961E+00 | 0 |
| S7 | −5.9808E−02 | −2.3435E+00 | 1.3801E+01 | −3.3280E+01 | 0 |
| S8 | −1.0242E+00 | 2.0299E+00 | −7.8454E+00 | 2.2522E+01 | 0 |
| S9 | 3.0472E−01 | −4.2934E+00 | 5.5364E+00 | 2.5216E+01 | 0 |
| S10 | −3.3860E−01 | 2.8147E−01 | −4.4594E−01 | 1.7858E+00 | 0 |
| S11 | 1.1666E−01 | −4.6817E−01 | 2.6234E−01 | −1.6935E−01 | 5.4105E−05 |
| S12 | 3.3818E−01 | −8.5313E−01 | 5.4756E−01 | −1.8769E−01 | 3.6446E−06 |

In addition, f1=−1.00 mm; f2=−8.07 mm; f3=1.93 mm; f4=0.87 mm; f5=−1.24 mm; f6=1.59 mm; f=0.74 mm; HFOV=82°; TTL=4.60 mm; Fno: 2.4.

Embodiment 7

In embodiment 7, the ultra-wide-angle lens assembly meets the conditions in the following tables:

TABLE 13

| Surface | Surface type | Curvature radius | Thickness | refractive index/abbe | Conic coefficient |
|---|---|---|---|---|---|
| Obj | spherical | infinity | infinity | | |
| S1 | spherical | 300.0000 | 0.3307 | 1.586/61.1 | |
| S2 | aspheric | 0.5157 | 0.3986 | | −1.3644 |
| S3 | aspheric | 1.2393 | 0.3000 | 1.544/56.11 | 0.0000 |
| S4 | aspheric | 0.9081 | 0.0765 | | −0.5054 |
| S5 | aspheric | 0.8399 | 0.6281 | 1.636/23.78 | −0.1904 |
| S6 | aspheric | 4.0977 | 0.2398 | | −11.4832 |
| STO | spherical | infinity | 0.0353 | | |
| S7 | aspheric | 1.4505 | 0.6104 | 1.544/56.11 | 1.4051 |
| S8 | aspheric | −0.6172 | 0.0340 | | −0.4962 |
| S9 | aspheric | −0.6576 | 0.3000 | 1.636/23.78 | 0.0315 |
| S10 | aspheric | −2.0059 | 0.0896 | | −0.4555 |
| S11 | aspheric | 1.0311 | 0.4559 | 1.544/56.11 | −8.6043 |
| S12 | aspheric | 7.0546 | 0.1000 | | 0.0000 |
| S13 | spherical | infinity | 0.3000 | 1.517/64.17 | |
| S14 | spherical | infinity | 0.4878 | | |
| S15 | spherical | infinity | | | |

TABLE 14

| Surface | A4 | A6 | A8 | A10 | A12 | A14 |
|---|---|---|---|---|---|---|
| S2 | −9.8526E−02 | 2.2946E−02 | −2.3849E−02 | −3.9818E−02 | 3.9042E−02 | 2.6296E−12 |
| S3 | −1.4187E−01 | −4.1235E−03 | −4.6921E−02 | 1.9824E−02 | −8.6189E−05 | 0 |
| S4 | 4.2450E−01 | −6.7106E−01 | 1.3450E−01 | −7.4784E−02 | −5.7448E−06 | 0 |
| S5 | 2.9329E−02 | −2.3330E−01 | −1.4517E−01 | 5.2545E−02 | 0 | 0 |
| S6 | 2.8179E−01 | 1.6790E+00 | −5.8320E+00 | 1.9917E+01 | 0 | 0 |
| S7 | 2.8285E−02 | −1.9718E+00 | 2.2190E+01 | −7.7431E+01 | 0 | 0 |
| S8 | −6.9603E−01 | 1.3722E+00 | −5.2083E+00 | 3.4272E+01 | 0 | 0 |
| S9 | −1.3575E−02 | −3.0536E+00 | 8.8446E+00 | 2.4793E+01 | 0 | 0 |
| S10 | −3.9566E−01 | 3.4116E−01 | −2.2214E−01 | 1.6187E+00 | 0 | 0 |
| S11 | 4.3405E−02 | −4.5215E−01 | 1.7871E−01 | −1.4143E−01 | 5.4105E−05 | 0 |
| S12 | 3.6525E−01 | −8.5368E−01 | 5.6374E−01 | −1.7944E−01 | 3.6446E−06 | 0 |

In addition, f1=−0.88 mm; f2=−9.14 mm; f3=1.53 mm; f4=0.88 mm; f5=−1.67 mm; f6=2.15 mm; f=0.69 mm; HFOV=85°; TTL=4.39 mm; Fno: 2.4.

Embodiment 8

In embodiment 8, the ultra-wide-angle lens assembly meets the conditions in the following tables:

TABLE 15

| Surface | Surface type | Curvature radius | Thickness | refractive index/abbe | Conic coefficient |
|---|---|---|---|---|---|
| Obj | spherical | infinity | infinity | | |
| S1 | aspheric | 12.3454 | 0.3200 | 1.544/56.11 | 7.8586 |
| S2 | aspheric | 0.5268 | 0.7588 | | −1.0200 |
| S3 | aspheric | 2.3640 | 0.2802 | 1.544/56.11 | 0.0000 |
| S4 | aspheric | 0.9962 | 0.2639 | | −0.2806 |
| S5 | aspheric | 1.2879 | 0.4956 | 1.636/23.78 | 0.2781 |
| S6 | aspheric | −3.6944 | 0.2086 | | −99.9990 |
| STO | spherical | infinity | 0.0307 | | |
| S7 | aspheric | 1.6646 | 0.5122 | 1.544/56.11 | 1.0428 |
| S8 | aspheric | −0.5691 | 0.0450 | | −0.6144 |
| S9 | aspheric | −0.6330 | 0.2800 | 1.636/23.78 | −0.0356 |
| S10 | aspheric | −27.3251 | 0.0424 | | −69.2395 |
| S11 | aspheric | 0.8689 | 0.5690 | 1.544/56.11 | −9.1755 |
| S12 | aspheric | 8.7484 | 0.1050 | | −25.7126 |
| S13 | spherical | infinity | 0.2100 | 1.517/64.17 | |
| S14 | spherical | infinity | 0.3571 | | |
| S15 | spherical | infinity | | | |

| formula | embodiment | | | | | | | |
|---|---|---|---|---|---|---|---|---|
| | 1 | 2 | 3 | 4 | 5 | 6 | 7 | 8 |
| \|tan(HFOV)\|/TTL | 2.60 | 2.61 | 3.59 | 0.97 | 1.69 | 1.55 | 2.60 | 2.55 |
| f1/f | −1.31 | −1.26 | −1.43 | −1.38 | −1.35 | −1.35 | −1.27 | −1.94 |
| SAG12/CT1 | 1.89 | 2.14 | 1.72 | 1.92 | 1.86 | 1.49 | 2.14 | 2.46 |
| f/f2 | −0.05 | −0.05 | −0.17 | −0.16 | −0.13 | −0.09 | −0.07 | −0.15 |
| \|(R8 − R9)/(R8 + R9)\| | 0.02 | 0.02 | 0.03 | 0.01 | 0.04 | 0.03 | 0.03 | 0.05 |
| R4/R5 | 1.09 | 1.13 | 0.96 | 1.02 | 1.13 | 1.15 | 1.08 | 0.77 |
| Yc62/ImgH | 0.59 | 0.52 | 0.52 | 0.59 | 0.52 | 0.54 | 0.53 | 0.64 |
| f45/f | 2.84 | 2.57 | 2.50 | 1.91 | 2.42 | 2.60 | 2.50 | 5.42 |

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples" in various places throughout this specification are not necessarily referring to the same embodiment or example of the present disclosure. Furthermore, the particular features, structures, materials, or characteristics may be combined in any suitable manner in one or more embodiments or examples.

TABLE 16

| Surface | A4 | A6 | A8 | A10 | A12 | A14 | A16 |
|---|---|---|---|---|---|---|---|
| S2 | 1.0744E−03 | 3.4436E−05 | 7.3896E−06 | 8.9375E−07 | 4.8546E−08 | −1.0311E−08 | −3.8837E−09 |
| S3 | −2.4721E−01 | 8.8483E−03 | −7.1076E−03 | −9.7743E−03 | 2.2522E−02 | −4.0572E−03 | 0 |
| S4 | −2.0489E−01 | 2.4541E−02 | 2.1978E−02 | 2.3098E−02 | −1.8534E−02 | 0 | 0 |
| S5 | 9.5379E−01 | −1.7273E−01 | 2.2182E+00 | −9.3653E+00 | 4.6751E−01 | 0 | 0 |
| S6 | 3.3901E−01 | −5.8523E−01 | 4.4628E+00 | −5.7830E+00 | 0 | 0 | 0 |
| S7 | −1.4103E−01 | −2.3864E−01 | −1.1061E+00 | 1.4119E+00 | 0 | 0 | 0 |
| S8 | −2.1927E−01 | −1.8991E+00 | −1.4566E+01 | −8.6415E+00 | 0 | 0 | 0 |
| S9 | −5.8735E−01 | 4.4815E−01 | −8.2047E+00 | −2.9770E+00 | 0 | 0 | 0 |
| S10 | 1.1402E−01 | −3.2907E+00 | 7.9078E+00 | 4.1330E+01 | 0 | 0 | 0 |
| S11 | −4.9546E−01 | 7.3156E−01 | 4.1845E−01 | 1.7233E+00 | 0 | 0 | 0 |
| S12 | 9.9230E−02 | −4.3741E−01 | 2.1778E−01 | 1.1885E−01 | −8.3512E−02 | 0 | 0 |
| | 3.6301E−01 | −6.8642E−01 | 4.1723E−01 | −1.2374E−01 | −1.8844E−02 | 0 | 0 |

In addition, f1=−1.02 mm; f2=−3.40 mm; f3=1.55 mm; f4=0.84 mm; f5=−1.01 mm; f6=1.72 mm; f=0.52 mm; HFOV=95°; TTL=4.48 mm; Fno: 2.4.

In embodiments 1-8, each formula meets the corresponding conditions in the following tables:

Although explanatory embodiments of the present invention have been shown and described, it would be appreciated by those ordinary skilled in the art that various changes, modifications, alternatives and variants can be made in these embodiments without departing from principles and spirits of the present invention, and the scope of the present invention is restricted by claims and their equivalents.

What is claimed is:

1. An ultra-wide-angle lens assembly, comprising a first lens, a second lens, a third lens, a fourth lens, a fifth lens and a sixth lens from an object side of the ultra-wide-angle lens assembly to an image side of the ultra-wide-angle lens assembly in turn, wherein
the first lens is of a negative refractive power;
the second lens is of a refractive power, an object side surface of the second lens is convex, and an image side surface of the second lens is concave;
the third lens is of a positive refractive power, and an object side surface of the third lens is convex;
the fourth lens is of a positive refractive power;
the fifth lens is of a negative refractive power; and
the sixth lens is of a positive refractive power, and an image side surface of the sixth lens has a proximal portion in relative to an optical axis in a concave shape,
the ultra-wide-angle lens assembly meets the following formulas:

$$|\tan(HFOV)|/TTL>0.9 \text{ mm}^{-1}; \text{ and}$$

$$-2.0<f1/f<0,$$

wherein
HFOV equals to half of a maximum field angle of the ultra-wide-angle lens assembly,
TTL represents a total length of the ultra-wide-angle lens assembly,
f1 represents an effective focal length of the first lens, and
f represents an effective focal length of the ultra-wide-angle lens assembly;
wherein the ultra-wide-angle lens assembly meets the following formula:

$$1<SAG12/CT1<2.5,$$

wherein
SAG12 represents a horizontal displacement from an intersection of the image side surface of the first lens and the optic axis to a maximum effective radius of the image side surface of the first lens: and
CT1 represents a thickness of the first lens in a direction along the optic axial.

2. The ultra-wide-angle lens assembly according to claim 1, wherein the first lens is made of a glass or plastic material.

3. The ultra-wide-angle lens assembly according to claim 2, wherein the ultra-wide-angle lens assembly comprises an aperture stop arranged between the third lens and the fourth lens.

4. The ultra-wide-angle lens assembly according to claim 1, wherein an image side surface of the first lens is concave.

5. The ultra-wide-angle lens assembly according to claim 4, wherein the ultra-wide-angle lens assembly comprises an aperture stop arranged between the third lens and the fourth lens.

6. The ultra-wide-angle lens assembly according to claim 1, wherein the ultra-wide-angle lens assembly meets the following formula:

$$-0.2<f/f2<0,$$

wherein
f2 represents an effective focal length of the second lens, and
f represents the effective focal length of the ultra-wide-angle lens assembly.

7. The ultra-wide-angle lens assembly according to claim 6, wherein the ultra-wide-angle lens assembly comprises an aperture stop arranged between the third lens and the fourth lens.

8. The ultra-wide-angle lens assembly according to claim 1, wherein an image side surface of the fourth lens is convex, an object side surface of the fifth lens is concave, and the ultra-wide-angle lens assembly meets the following formula:

$$|(R8-R9)/R8+R9)|<0.1,$$

wherein
R8 represents a curvature radius of the image side surface of the fourth lens, and
R9 represents a curvature radius of the object side surface of the fifth lens.

9. The ultra-wide-angle lens assembly according to claim 8, wherein the ultra-wide-angle lens assembly comprises an aperture stop arranged between the third lens and the fourth lens.

10. The ultra-wide-angle lens assembly according to claim 1, wherein the ultra-wide-angle lens assembly meets the following formula:

$$0.5<R4/R5<1.5,$$

wherein
R4 represents a curvature radius of the image side surface of the second lens, and
R5 represents a curvature radius of the object side surface of the third lens.

11. The ultra-wide-angle lens assembly according to claim 10, wherein the ultra-wide-angle lens assembly comprises an aperture stop arranged between the third lens and the fourth lens.

12. The ultra-wide-angle lens assembly according to claim 1, wherein the image side surface of the sixth lens comprises at least one point of inflection, and the ultra-wide-angle lens assembly meets the following formula:

$$0.5<Yc62/ImgH<1,$$

wherein
Yc62 represents a vertical distance from the point of inflection on the image side surface of the sixth lens to the optic axis, and
ImgH represents a half-length of a diagonal of an effective pixel region at an imaging side surface of the ultra-wide-angle lens assembly.

13. The ultra-wide-angle lens assembly according to claim 12, wherein the ultra-wide-angle lens assembly comprises an aperture stop arranged between the third lens and the fourth lens.

14. The ultra-wide-angle lens assembly according to claim 1, wherein the ultra-wide-angle lens assembly meets the following formula:

$$1.5<f45/f<6.0,$$

wherein
f45 represents a combined focal length of the fourth lens and the fifth lens, and
f represents the effective focal length of the ultra,-wide-angle lens assembly.

15. The ultra-wide-angle lens assembly according to claim 14, wherein the ultra-wide-angle lens assembly comprises an aperture stop arranged between the third lens and the fourth lens.

16. The ultra-wide-angle lens assembly according to claim 1, wherein the ultra-wide-angle lens assembly comprises an aperture stop arranged between the third lens and the fourth lens.

17. The Ultra-wide-angle lens assembly according to claim 16, wherein an image side surface of the third lens is concave, and an object side surface of the sixth lens has a proximal portion in relative to the optical axis in a convex shape.

18. The ultra-wide-angle lens assembly according to claim 17, wherein an object side surface of the fourth lens is convex, and an image side surface of the fifth lens is convex.

19. An ultra-wide-angle lens assembly, comprising a first lens, a second lens, a third lens, a fourth lens, a fifth lens and a sixth lens from an object side of the ultra-wide-angle lens assembly to an image side of the ultra-wide-angle lens assembly in turn, wherein the first lens is of a negative refractive power;
the second lens is of a refractive power, an object side surface of the second lens is convex, and an image side surface of the second lens is concave;
the third lens is of a positive refractive power, and an object side surface of the third lens is convex;
the fourth lens is of a positive refractive power;
the fifth lens is of a negative refractive power; and
the sixth lens is of a positive refractive power, and an image side surface of the sixth lens has a proximal portion in relative to an optical axis in a concave shape,
the ultra-wide-angle lens assembly meets the following formulas:

$|\tan(HFOV)|/TTL > 0.9$ mm$^{-1}$; and $-2.0 < f1/f < 0,$ wherein
HFOV equals to half of a maximum field angle of the ultra-wide-angle lens assembly,
TTL represents a total length of the ultra-wide-angle lens assembly,
f1 represents an effective focal length of the first lens, and
f represents an effective focal length of the ultra-wide-angle lens assembly,
wherein an image side surface of the fifth lens is convex.

20. An ultra-wide-angle lens assembly, comprising a first lens, a second lens, a third lens, a fourth lens, a fifth lens and a sixth lens from an object side of the ultra-wide-angle lens assembly to an image side of the ultra-wide-angle lens assembly in turn, wherein the first lens is of a. negative refractive power;
the second lens is of a refractive power, an object side surface of the second lens is convex, and an image side surface of the second lens is concave:
the third lens is of a positive refractive power, and an object side surface of the third lens is convex;
the fourth lens is of a positive refractive power;
the fifth lens is of a negative refractive power; and
the sixth lens is of a positive refractive power, and an image side surface of the sixth lens has a proximal portion in relative to an optical axis in a concave shape,
the ultra-wide-angle lens assembly meets the following formulas:

$|\tan(HFOV)|/TTL > 0.9$ mm$^{-1}$; and $-2.0 < f1/f < 0,$ wherein.
HFOV equals to half of a maximum field angle of the ultra-wide-angle lens assembly,
TTL represents a total length of the ultra-wide-angle lens assembly,
f1 represents an effective focal length of the first lens, and
f represents an effective focal length of the ultra-wide-angle lens assembly,
wherein an object side surface of the fifth lens is concave and an image side surface of the fifth lens is convex.

* * * * *

UNITED STATES PATENT AND TRADEMARK OFFICE
CERTIFICATE OF CORRECTION

PATENT NO. : 10,061,101 B2
APPLICATION NO. : 15/305281
DATED : August 28, 2018
INVENTOR(S) : Fujian Dai et al.

Page 1 of 2

It is certified that error appears in the above-identified patent and that said Letters Patent is hereby corrected as shown below:

In the Specification

At Column 2, Line 14, the phrase "optic axis" should read -- optical axis --; and At Column 2, Line 17, the phrase "optic axial" should read -- optical axis --; and At Column 2, Line 55, the phrase "optic axis" should read -- optical axis --; and At Column 6, Line 62, the phrase "optic axis" should read -- optical axis --; and At Column 6, Line 65, the phrase "optic axial" should read -- optical axis --; and At Column 7, Line 48, the phrase "optic axis" should read -- optical axis --; and At Column 7, Line 54, the phrase "optic axis" should read -- optical axis --; and At Column 7, Line 55, the phrase "optic axis" should read -- optical axis --; and At Column 8, Line 33, in the formula "Aih'" should read -- $Aih^i$ --; and At Column 8, Line 37, the phrase "optic axis" should read -- optical axis --.

In the Claims

At Column 17, Claim 1, Line 42, the phrase "optic axis" should read -- optical axis --; and At Column 17, Claim 1, Line 45, the phrase "optic axial" should read -- optical axis --; and At Column 18, Claim 8, Line 12, the formula "|(R8-R9)/R8+R9)|<0.1" should read -- |(R8-R9)/(R8+R9)|<0.1 --; and Signed and Sealed this
Sixth Day of November, 2018

Andrei Iancu
*Director of the United States Patent and Trademark Office*

At Column 18, Claim 12, Line 46, the phrase "optic axis" should read -- optical axis --; and At Column 18, Claim 14, Line 62, the "," in "ultra,-wide-angle lens" should be deleted; and At Column 19, Claim 17, Line 5, the word "Ultra" should read -- ultra --; and At Column 20, Claim 20, Line 12, the "." in "a. negative" should be deleted.